United States Patent
Zeng et al.

(10) Patent No.: US 12,463,401 B2
(45) Date of Patent: Nov. 4, 2025

(54) LASER SOURCE AND METHOD FOR FORMING THE SAME

(71) Applicant: Nanyang Technological University, Singapore (SG)

(72) Inventors: Yongquan Zeng, Singapore (SG); Udvas Chattopadhyay, Singapore (SG); Baile Zhang, Singapore (SG); Yi Dong Chong, Singapore (SG); Qijie Wang, Singapore (SG)

(73) Assignee: Nanyang Technological University, Singapore (SG)

( * ) Notice: Subject to any disclaimer, the term of this patent is extended or adjusted under 35 U.S.C. 154(b) by 747 days.

(21) Appl. No.: 17/626,401

(22) PCT Filed: Jul. 13, 2020

(86) PCT No.: PCT/SG2020/050399
§ 371 (c)(1),
(2) Date: Jan. 11, 2022

(87) PCT Pub. No.: WO2021/010894
PCT Pub. Date: Jan. 21, 2021

(65) Prior Publication Data
US 2022/0255298 A1 Aug. 11, 2022

(30) Foreign Application Priority Data
Jul. 15, 2019 (SG) .............. 10201906528Y

(51) Int. Cl.
*H01S 5/34* (2006.01)
*H01S 5/11* (2021.01)

(52) U.S. Cl.
CPC .............. *H01S 5/3408* (2013.01); *H01S 5/11* (2021.01); *H01S 5/3401* (2013.01); *H01S 2302/02* (2013.01)

(58) Field of Classification Search
CPC ....................................................... H01S 5/11
See application file for complete search history.

(56) References Cited

U.S. PATENT DOCUMENTS

| | | | |
|---|---|---|---|
| 2010/0176200 A1 | 7/2010 | Vollmer et al. | |
| 2019/0074663 A1* | 3/2019 | Saito | H01S 5/11 |
| 2020/0176943 A1* | 6/2020 | Kante | H01S 5/1071 |

FOREIGN PATENT DOCUMENTS

| | | |
|---|---|---|
| CN | 102044845 | 5/2011 |
| JP | 2002-033549 | 1/2002 |

(Continued)

OTHER PUBLICATIONS

Wu, X., Meng, Y., Tian, J. et al. Direct observation of valley-polarized topological edge states in designer surface plasmon crystals. Nat Commun 8, 1304 (2017). https://doi.org/10.1038/s41467-017-01515-2 (Year: 2017).*

(Continued)

*Primary Examiner* — Minsun O Harvey
*Assistant Examiner* — Stephen Sutton Kotter
(74) *Attorney, Agent, or Firm* — Womble Bond Dickinson (US) LLP

(57) ABSTRACT

According to embodiments of the present invention, a laser source is provided. The laser source includes a photonic crystal structure including a first domain having a plurality of first holes defined therein, the first domain being associated with a first set of Chern numbers, and a second domain having a plurality of second holes defined therein, the second domain being associated with a second set of Chern numbers, wherein the plurality of first holes and the plurality of second holes are arranged to define an interface region between the first domain and the second domain, the interface region defining an optical cavity for lasing. According (Continued)

to further embodiments of the present invention, a method for forming a laser source is also provided.

18 Claims, 19 Drawing Sheets

(56) References Cited

FOREIGN PATENT DOCUMENTS

| JP | 2005-250202 | | 9/2005 |
|---|---|---|---|
| JP | 2018-088456 | | 6/2018 |
| JP | 2018088456 A | * | 6/2018 |
| WO | 2018185749 | | 10/2018 |
| WO | 2019027729 | | 2/2019 |

OTHER PUBLICATIONS

English Translation of Tsuji. (Year: 2018).*
Faist, J. et al., Quantum Cascade Laser. Science, 264, 553-556, Apr. 22, 1994.
Kohler, R. et al., Terahertz semiconductor-heterostructure laser. Nature 417, 156-159 May 9, 2002.
Hasan, M. Z. & Kane, C. L., Colloquium: Topological insulators. Rev. Mod. Phys. 82, 3045-3067, Oct.-Dec. 2010.
Ozawa, T. et al., Topological photonics. Rev. Mod. Phys. 91, 015006, Jan.-Mar. 2019.
Bandres, M. A. et al., Topological insulator laser: Experiments. Science 359, eaar4005, Mar. 16, 2018.
Harari, G. et al., Topological insulator laser: Theory. Science 359, eaar4003, Mar. 16, 2018.
Bahari, B. et al., Nonreciprocal lasing in topological cavities of arbitrary geometries. Science 10.1126/science.aao4551, Oct. 12, 2017.
Ju, L. et al., Topological valley transport at bilayer graphene domain walls. Nature 520, 650-655, Apr. 30, 2015.
Ma, T. & Shvets, G., All-Si valley-Hall photonic topological insulator. New J. Phys. 18, 025012, Feb. 10, 2016.
Gao, F. et al., Topologically protected refraction of robust kink states in valley photonic crystals. Nat. Phys. 14, 140-144. Feb. 2018.
Schaibley, J. R. et al., Valleytronics in 2D materials. Nat. Rev. Mater. 1, 16055, Nov. 2016.
Vitiello, M. S., Scalari, G., Williams, B. & Natale, P. De., Quantum cascade lasers☐: 20 years of challenges. Opt. Express 23, 5167-5182, Feb. 2015.
Dhillon, S. S. et al., The 2017 terahertz science and technology roadmap. J. Phys. D. Appl. Phys. 50, 043001, 2017.
Dhillon, S. S. et al., Terahertz transfer onto a telecom optical carrier. Nat. Photonics 1, 411-415, Jul. 2007.
Gao, J. R. et al., Terahertz heterodyne receiver based on a quantum cascade laser and a superconducting bolometer. Appl. Phys. Lett. 86, 244104, 2005.
Hübers, H.-W. et al., Terahertz quantum cascade laser as local oscillator in a heterodyne receiver. Opt. Express 13, 5890-5896, Jul. 2005.
Dean, P. et al., Terahertz imaging using quantum cascade lasers—a review of systems and applications. J. Phys. D. Appl. Phys. 47, 374008, Aug. 28, 2014.
Tonouchi, M., Cutting-edge terahertz technology. Nat. Photonics 1, 97-105, Feb. 2007.
Zeng, Y., Qiang, B. & Wang, Q. J, Photonic Engineering Technology for the Development of Terahertz Quantum Cascade Lasers. Adv. Opt. Mater. 1900573, 2019.
Schröder, H. W., Stein, L., Frölich, D., Fugger, B. & Welling, H., A high-power single-mode cw dye ring laser. Appl. Phys. 14, 377-380 (1977).
Booth, M. F., Schremer, A. & Ballantyne, J. M., Spatial beam switching and bistability in a diode ring laser. Appl. Phys. Lett. 76, 1095-1097, Feb. 18, 2000.

Pérez-Serrano, A., Javaloyes, J. & Balle, S., Longitudinal mode multistability in Ring and Fabry-Pérot lasers: the effect of spatial hole burning. Opt. Express 19, 3284-3289, Feb. 2011.
Gordon, A. et al., Multimode regimes in quantum cascade lasers: From coherent instabilities to spatial hole burning. Phys. Rev. A 77, 053804, May 2008.
Hafezi, M., Demler, E. A., Lukin, M. D. & Taylor, J. M., Robust optical delay lines with topological protection. Nat. Phys. 7, 907-912, 2011.
Peano, V., Houde, M., Marquardt, F. & Clerk, A. A., Topological quantum fluctuations and traveling wave amplifiers. Phys. Rev. X 6, 041026, 1-17, Nov. 1, 2016.
Zhou, X., Wang, Y., Leykam, D. & Chong, Y. D., Optical isolation with nonlinear topological photonics. New J. Phys. 19, 095002, Sep. 8, 2017.
Mittal, S., Goldschmidt, E. A. & Hafezi, M., A topological source of quantum light. Nature 561, 502-506, Sep. 27, 2018.
Barik, S. et al., A topological quantum optics interface. Science 359, 666-668, Feb. 9, 2018.
Gao, Z. et al., Valley surface-wave photonic crystal and its bulk/edge transport. Phys. Rev. B 96, 201402, 1-6, Nov. 6, 2017.
Wu, X. et al., Direct observation of valley-polarized topological edge states in designer surface plasmon crystals. Nat. Commun. 8, 1304 (2017).
Sandoghdar, V. et al., Very low threshold whispering-gallery-mode microsphere laser. Phys. Rev. A 54, R1777-R1780, Sep. 1996.
Seclì, M., Capone, M. & Carusotto, I., Theory of chiral edge state lasing in a two-dimensional topological system. Phys. Rev. Res. 1, 033148, Dec. 4, 2019.
Belkin, M. et al., High-temperature operation of terahertz quantum cascade laser sources. IEEE J. Sel. Top. Quantum Electron. 15, 952-967, May/Jun. 2009.
Williams, B. S., Kumar, S., Callebaut, H., Hu, Q. & Reno, J. L., Terahertz quantum-cascade laser at λ≈100 um using metal waveguide for mode confinement. Appl. Phys. Lett. 83, 2124-2126, Sep. 15, 2003.
Holton C., et al., Annual Laser Market Review & Forecast: Lasers enabling lasers, Jan. 19, 2018, https://www.laserfocusworld.com/lasers-sources/article/16555260/annual-laser-market-review-forecast-lasers-enabling-lasers.
M.C. Rechtsman et al., Photonic Floquet topological insulators, Nature 496, 196-200, Apr. 11, 2013.
Y. Chong, Photonic insulators with a twist, Nature 496, 173-174, Apr. 11, 2013.
M. Hafezi et al., Imaging topological edge states in silicon photonics, Nat. Photon. 7, 1001-1006, Dec. 2013.
Duxbury G., et al., Quantum cascade semiconductor infrared and far-infrared lasers: from trace gas sensing to non-linear optics, Chemical Society Reviews, 34, 921-934, Apr. 19, 2005.
Wittek, S. et al., Towards the experimental realization of the topological insulator laser. In CLEO: QELS_Fundamental Science FTh1D-3 (Optical Society of America, 2017).
Sirtori, C., Barbieri, S. & Colombelli, R., Wave engineering with THz quantum cascade lasers. Nat. Photonics 7, 691-701, Aug. 29, 2013.
St-Jean, P. et al., Lasing in topological edge states of a one-dimensional lattice. Nat. Photonics 11, 651-656, Oct. 2017.
Zhao, H. et al., Topological hybrid silicon microlasers. Nat. Commun. 9, 981 (2018).
Dong, J. W., Chen, X. D., Zhu, H., Wang, Y. & Zhang, X., Valley photonic crystals for control of spin and topology. Nat. Mater. 16, 298-302, Mar. 2017.
Kang, Y., Ni, X., Cheng, X., Khanikaev, A. B. & Genack, A. Z., Pseudo-spin-valley coupled edge states in a photonic topological insulator. Nat. Commun. 9, 3029 (2018).
Shalaev, M. I., Walasik, W., Tsukernik, A., Xu, Y. & Litchinitser, N. M., Robust topologically protected transport in photonic crystals at telecommunication wavelengths. Nat. Nanotechnol. 14, 31-34, Jan. 2019.
Lu, J. et al., Observation of topological valley transport of sound in sonic crystals. Nat. Phys. 13, 369-374, Apr. 2017.

(56) References Cited

OTHER PUBLICATIONS

Vitiello, M. S. & Tredicucci, A., Tunable emission in THz quantum cascade lasers. IEEE Trans. Terahertz Sci. Technol. 1, 76-84, Sep. 2011.

Fathololoumi, S. et al., Terahertz quantum cascade lasers operating up to ~200 K with optimized oscillator strength and improved injection tunneling. Opt. Express 20, 3866-3876, Feb. 2012.

Cao, Hui, and Heeso Noh., Lasing in Amorphous Nanophotonic Structures, Amorphous Nanophotonics. Springer, Berlin, Heidelberg, 2013. 227-265.

Spreeuw, R. J. C., Neelen, R. C., van Druten, N. J., Eliel, E. R. & Woerdman, J. P., Mode coupling in a He—Ne ring laser with backscattering. Phys. Rev. A 42, 4315-4324 Oct. 1, 1990.

Suh, W., Wang, Z., & Fan, S., Temporal coupled-mode theory and the presence of nonorthogonal modes in lossless multimode cavities. IEEE J. Quantum Electron. 40, 1511-1518, Oct. 2004.

Wu et al., "Scheme for Achieving a Topological Photonic Crystal by Using Dielectric Material", Physical Review Letters, PRL 114, 223901, Jun. 3, 2015.

Japan Application Office Action for Application No. 2022-502197, mailed Apr. 2, 2024 (3 pages).

\* cited by examiner

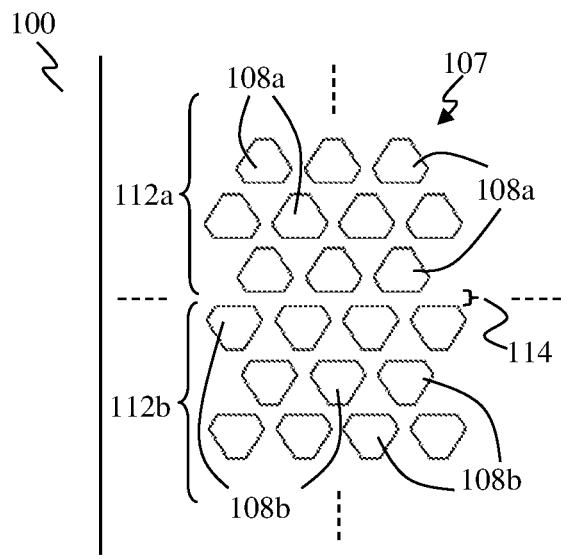

FIG. 1A

Form a photonic crystal structure having a first domain comprising a plurality of first holes defined therein, the first domain being associated with a first set of Chern numbers, and a second domain comprising a plurality of second holes defined therein, the second domain being associated with a second set of Chern numbers, wherein the plurality of first holes and the plurality of second holes are arranged to define an interface region between the first domain and the second domain, the interface region defining an optical cavity for lasing

FIG. 1B

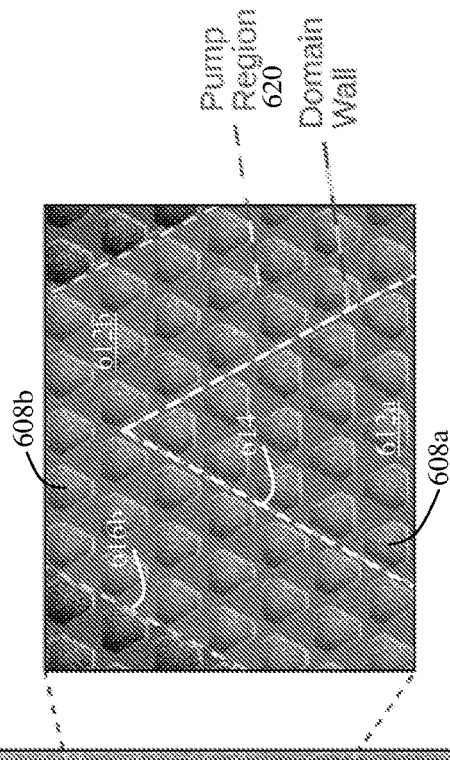
FIG. 6A
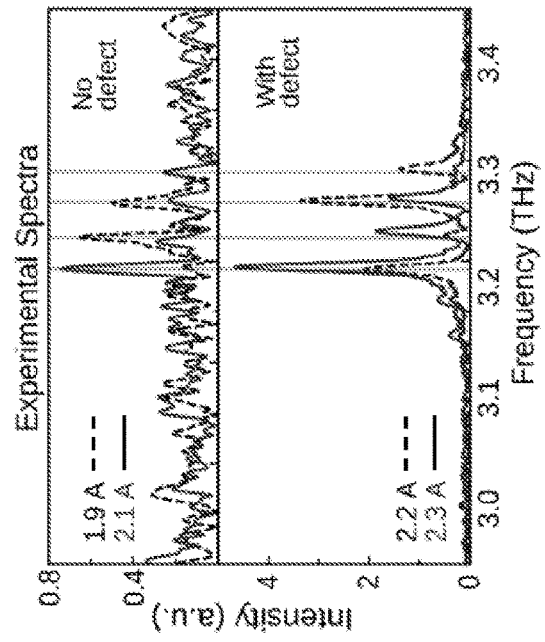
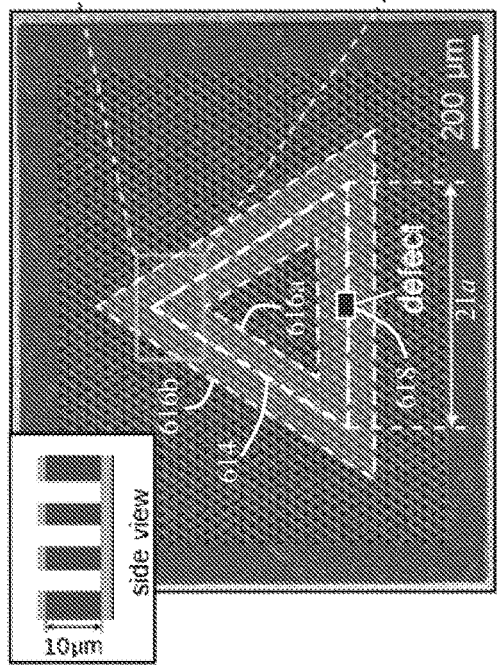
FIG. 6B
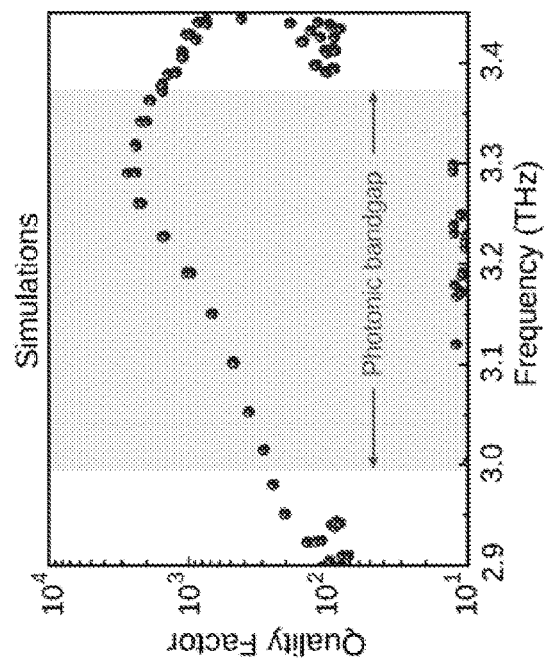
FIG. 6C

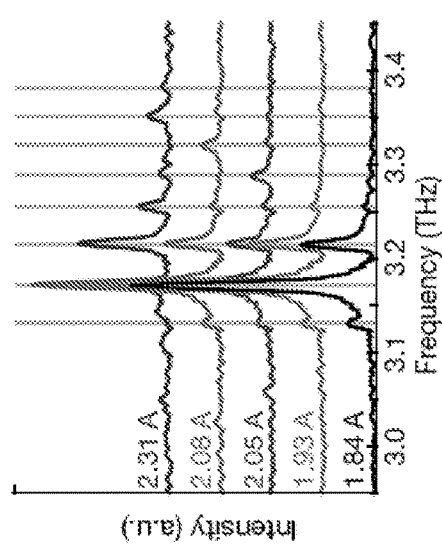
FIG. 10A
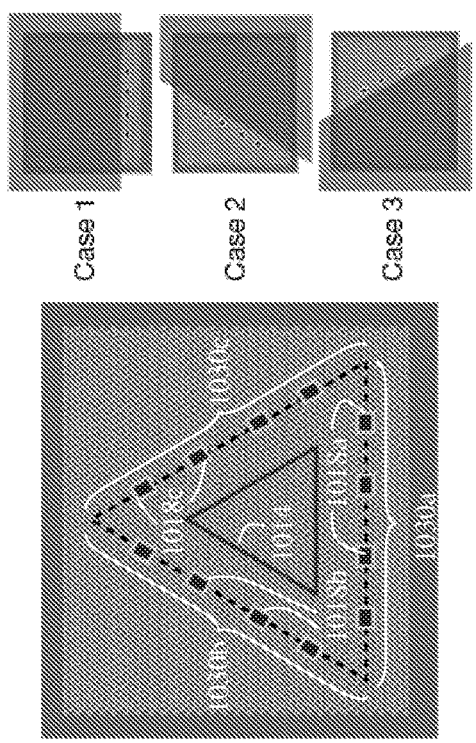
FIG. 10B
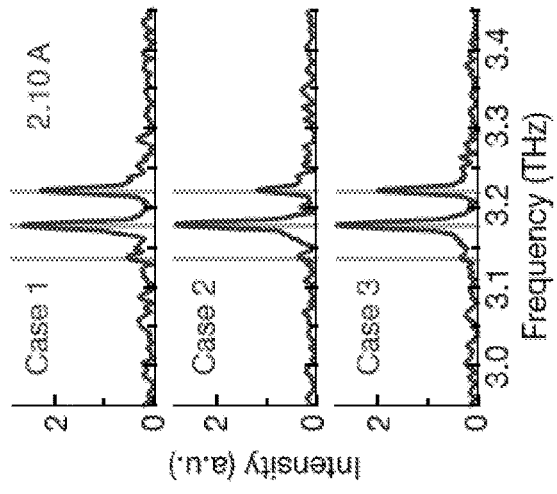
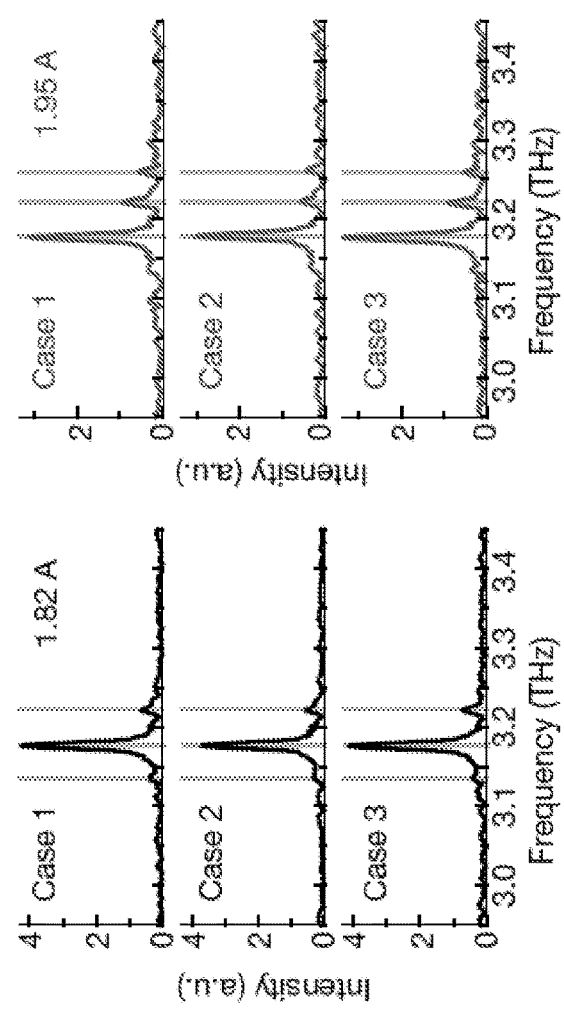
FIG. 10C
FIG. 10D
FIG. 10E

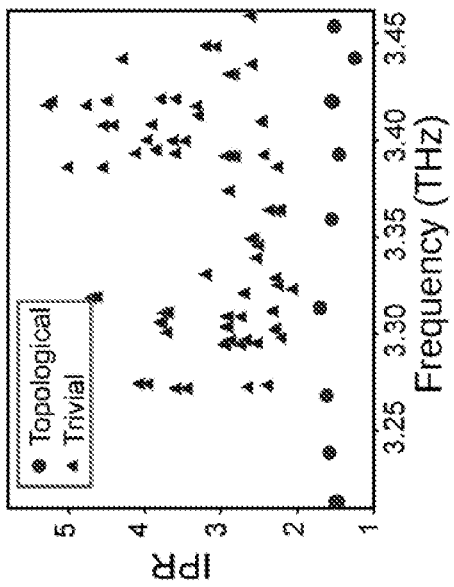
FIG. 13A
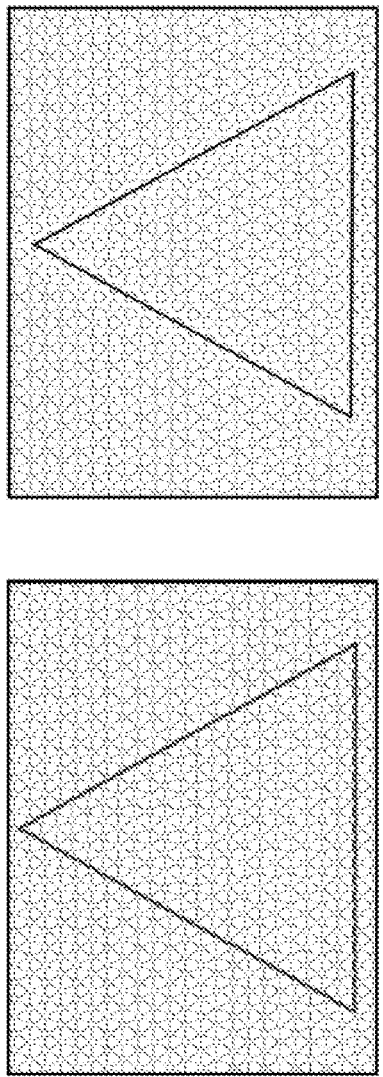
FIG. 13B
FIG. 13C
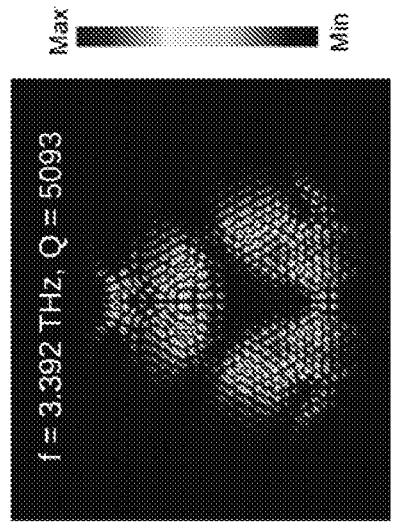
FIG. 13D
FIG. 13E
FIG. 13F

LASER SOURCE AND METHOD FOR FORMING THE SAME

CROSS-REFERENCE TO RELATED APPLICATIONS

This application is a national stage filing under 35 U.S.C. 371 of PCT/SG2020/050399, filed Jul. 13, 2020, which International Application was published by the International Bureau in English on Jan. 21, 2021, as WO 2021/010894, which claims the benefit of priority of Singapore patent application No. 10201906528Y, filed Jul. 15, 2019, which applications are hereby incorporated by reference in their entirety in this application.

TECHNICAL FIELD

Various embodiments relate to a laser source and a method for forming the laser source.

BACKGROUND

Quantum cascade lasers (QCLs) are electrically-pumped semiconductor lasers based on intersubband electron transitions in semiconductor multi-quantum-wells. They are among the most important sources of mid-infrared and terahertz (THz) radiation owing to their compactness, high power, and high efficiency. Their practical applications include telecommunication, THz signal processing, imaging, sensing and spectroscopy. As with any laser, the emission characteristics of a THz QCL depend on the design of the photonic cavity and are generally strongly affected by the cavity shape. One design element is the use of topological edge states, which are robust against alterations to the underlying structure, and can efficiently bypass defects (which may arise during fabrication and packaging) and sharp corners, forming running-wave modes. Recently, the concept of topology has migrated from condensed matter physics into photonics, giving rise to another type of lasing utilizing topologically protected photonic modes that can efficiently bypass corners and defects. Unlike conventional waves, topological edge states resist the formation of localised standing wave modes, which is helpful for suppressing the spatial hole-burning effect—a particular consideration for QCLs because their gain recovery processes are faster than carrier diffusion, which is unlike the known semiconductor lasers. Previous demonstrations of topological lasers have required an external laser source for optical pumping, and operated in the conventional optical frequency regime.

Topological edge states appear between spatial domains with band structures that are topologically distinct. There have been substantial efforts in recent years to implement such states in photonics, motivated by potential applications for robust optical delay lines, amplifiers, and other devices. Topological lasers have been realised in one-dimensional (1D) Su-Schrieffer-Heeger (SSH)-like systems, whose edge states act as high-Q (quality factor) nanocavity modes that lase under suitable gain. However, the edge states of 1D lattices do not support protected transport. For two-dimensional (2D) lattices, realising photonic topological edge states typically requires some means of effective breaking of time-reversal (T) symmetry to avoid the need to use magnetic materials. For example, a known device with topological lasing used a 2D array of ring resonators in which the clockwise or counterclockwise circulation of light in the resonators acts as a photonic pseudospin; staggered inter-resonator couplings generate an effective magnetic field and hence a T-broken band structure with nontrivial topology for each pseudospin. Such a design inherently requires large-scale structural features (for example, ring resonators) far exceeding the operating wavelength.

SUMMARY

The invention is defined in the independent claims. Further embodiments of the invention are defined in the dependent claims.

According to an embodiment, a laser source is provided. The laser source may include a photonic crystal structure including a first domain having a plurality of first holes defined therein, the first domain being associated with a first set of Chern numbers, and a second domain having a plurality of second holes defined therein, the second domain being associated with a second set of Chern numbers, wherein the plurality of first holes and the plurality of second holes are arranged to define an interface region between the first domain and the second domain, the interface region defining an optical cavity for lasing.

According to an embodiment, a method for forming a laser source is provided. The method may include forming a photonic crystal structure including a first domain having a plurality of first holes defined therein, the first domain being associated with a first set of Chern numbers, and a second domain having a plurality of second holes defined therein, the second domain being associated with a second set of Chern numbers, wherein the plurality of first holes and the plurality of second holes are arranged to define an interface region between the first domain and the second domain, the interface region defining an optical cavity for lasing.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which:

FIG. 1A shows a schematic top view of a portion of a laser source, according to various embodiments.

FIG. 1B shows a method for forming a laser source, according to various embodiments.

FIG. 2A shows a schematic perspective view of a quantum cascade ridge laser while

FIGS. 6A to 6C show fabrication and characterisation of a topological terahertz quantum cascade laser (THz QCL), according to various embodiments.

FIGS. 10A to 10E show a topological laser with an array of evanescent outcouplers and the corresponding results.

FIGS. 13A to 13F show the inverse participation ratio (IPR) for trivial and topologically non-trivial modes.

DETAILED DESCRIPTION

Figure 2A:
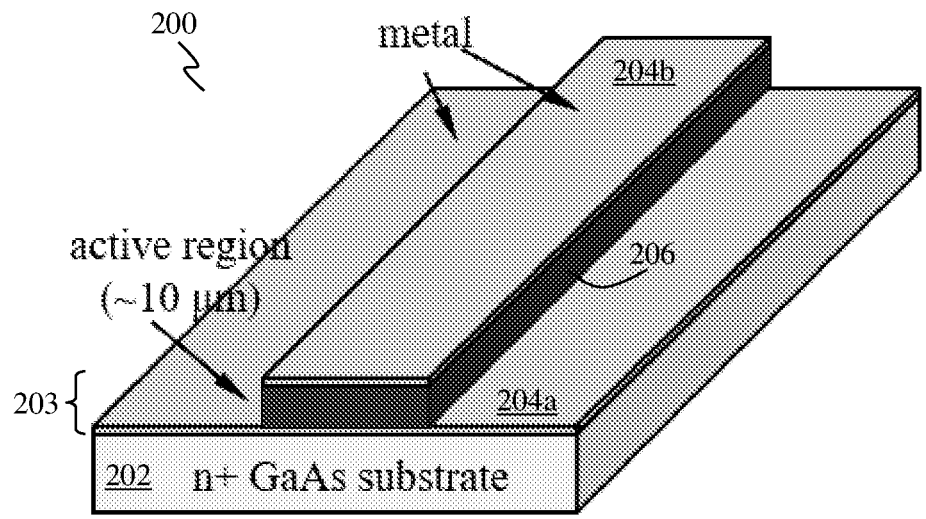

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the phrase "at least substantially" may include "exactly" and a reasonable variance.

In the context of various embodiments, the term "about" or "approximately" as applied to a numeric value encompasses the exact value and a reasonable variance.

As used herein, the term "and/or" includes any and all combinations of one or more of the associated listed items.

Various embodiments may provide a laser, for example, a quantum cascade topological laser, with robust valley edge modes. Various embodiments may provide an electrically pumped topological laser with valley edge modes.

Various embodiments may provide a topological laser based on photonic valley Hall effect.

Various embodiments may provide an electrically-pumped topological laser operating at terahertz (THz) frequency.

Quantum cascade lasers (QCLs) are one of the few compact electrically-pumped light sources in the technologically important mid-infrared and terahertz (THz) frequency region of the electromagnetic spectrum. Various embodiments provide a demonstration of a THz electrically-pumped QCL based on topologically-protected valley edge states. Unlike known topological lasers that relied on large-scale features to simulate topological insulators, the device of various embodiments may make use of the valley degree of freedom in photonic crystals, including, for example, a compact 'valley photonic crystal' design, analogous to two-dimensional (2D) gapped valleytronic materials. Lasing with regularly spaced emission peaks may occur in a sharp-cornered triangular cavity that may support topologically-protected running-wave modes with regularly-spaced emission peaks, even if perturbations are introduced into the underlying structure, owing to the existence of topologically protected valley edge states that circulate around the cavity without experiencing localisation. A similar triangular cavity lacking topological protection is shown to exhibit irregularly-spaced emission peaks corresponding to localised modes. The results, as will be described further below, show that valley edge states may be used to implement robust photonic-crystal lasers. The properties of the topological lasing modes may be examined by adding different outcouplers to the topological cavity. The laser based on valley edge states may open routes to the practical use of topological protection in electrically driven laser sources. It should be appreciated that the techniques disclosed herein may be applied to all or any types of lasers, not just THz QCLs.

Valley photonic crystals (VPCs) are photonic analogues of 2D valleytronic materials that host topological edge states protected by a valley degree of freedom (DOF) established by the underlying lattice symmetry. A valley photonic crystal is a photonic crystal design which has a bandgap with its lower band-edge and higher band-edge states having converse circular polarisations (left circular polarisation (LCP) vs right circular polarisation (RCP)) at the corners of the hexagonal Brillouin zone, denoted by K and K'. The LCP (RCP) state at K (or K') may be regarded as pseudo-valley-spin, analogous to the concept in 2D gapped valleytronic materials. In 2D materials, the valley DOF may have functionalities similar to spin in spintronic devices, but without requiring strong spin-orbit coupling. Likewise, VPCs can provide robust light transport in highly compact structures with periodicity on the order of the wavelength, without the need for magnetic materials or the complex construction of photonic pseudospins. They are therefore promising for the implementation of topological photonic crystal lasers. Topological photonic edge states are unidirectional, backscattering-free, and robust (e.g., immune to or effective against defects, disorders or sharp corners).

Various embodiments may provide an electrically pumped THz QCL based on the topological edge states of a VPC. Lasing may be achieved using a topological waveguide that forms a triangular loop, a cavity design that is different to known smoothly-shaped optical cavities. As will be described further below, multiple regularly-spaced emission peaks (i.e., a limited number of peaks per unit of frequency) may be observed, which are shown to correspond to topologically-protected states circulating around the triangular cavity without being localised at the sharp corners. Despite the sharp corners of the cavity, the lasing spectrum may exhibit robust regularly spaced emission peaks, a feature that may persist under disturbances including, for example, a point outcoupling defect along an arm or at a corner of the triangular cavity, and/or an array of outcoupling defects surrounding the triangular cavity, and/or an external waveguide acting as a directional outcoupler. Examining different configurations of defects and coupled waveguides show that the various properties of the lasing modes may be consistent with the topological valley edge states of the VPC. In contrast, a similar lasing cavity without topological protection (e.g., a comparable cavity based on a known photonic crystal defect waveguide; see FIGS. 9A to 9D to be described further below), the lasing modes behave very differently: they tend to be localised and exhibit highly irregular mode spacings.

There may be high backscattering in waveguides at sharp bends (such as at corners of a triangle). Topological protection, e.g., based on topologically-protected states, may address this issue and enable light to travel without backscattering in a closed loop which has sharp bends. A closed loop for light may be required for lasing. The edge states may be supported by a domain wall formed by two photonic crystal domains with different topologies or orientations (different Chern numbers). The frequencies of the edge states may be within the band gap region of the bulk photonic crystals in two sides, which may forbid the mode propagation into the bulk region of the photonic crystal. Therefore, the edge states may be localised at the interface, i.e., at the domain wall. When the bulk crystals (or bulk domains) at two sides of the interface have opposite Chern numbers or carry Chern numbers differing by an integer at a valley, there will be edge states located at the interface (domain wall), even when defects and sharp corner exist. And the propagation directions of the edge states may be reluctant to be inverted due to the large phase or large momentum (k) mismatch for two propagation directions. Therefore, the edge state may propagate through sharp corners and defects with negligible backscattering, which is referred to as "topological protection". In various embodiments, the topological domain wall may be formed by two domains of photonic crystals with different topologies, for example, with opposite valley Chern numbers (e.g., $-\frac{1}{2}$ and $\frac{1}{2}$) at a valley as will be described further below. This may determine the robustness of edge states.

The techniques disclosed herein may enable robust running-wave mode lasing (wavelength and mode distribution) that may be immune to sharp corners and big defects within the cavity of the laser. The power efficiency of the lasers may be enhanced by the defects.

FIG. 1A shows a schematic top view of a portion of a laser source 100, according to various embodiments. The laser source 100 includes a photonic crystal structure 107 including a first domain 112a having a plurality of first holes 108a defined therein, the first domain 112a being associated with a first set of Chern numbers, and a second domain 112b having a plurality of second holes 108b defined therein, the second domain 112b being associated with a second set of Chern numbers, wherein the plurality of first holes 108a and the plurality of second holes 108b are arranged to define an interface region 114 between the first domain 112a and the second domain 112b, the interface region 114 defining an optical cavity for lasing.

In other words, a laser source 100 with a photonic crystal structure 107 may be provided. The photonic crystal structure 107 may be or may include a valley photonic crystal structure. The photonic crystal structure 107 may be formed in a gain medium or active region of the laser source 100. The gain medium or active region may provide optical gain.

The photonic crystal structure 107 may include at least two domains, for example, a first domain 112a and a second domain 112b. The first domain 112a, having a plurality of first holes (or openings or apertures) 108a defined therein, may be associated with (or may define) a first set of (valley) Chern numbers. The second domain 112b, having a plurality of second holes (or openings or apertures) 108b defined therein, may be associated with (or may define) a second set of (valley) Chern numbers. Each of the first set of Chern numbers and the second set of Chern numbers may include a pair of Chern numbers. The first set of Chern numbers and the second set of Chern numbers may include non-zero Chern numbers.

The plurality of first holes 108a may be spaced apart from each other. The plurality of second holes 108b may be spaced apart from each other.

The plurality of first holes 108a and the plurality of second holes 108b may be arranged to define an interface region (or domain wall) 114 between the first domain 112a and the second domain 112b. The plurality of first holes 108a and the plurality of second holes 108b may be spaced apart from each other by the interface region 114. The interface region 114 may define an optical cavity for lasing. The optical cavity may allow for light propagation. The optical cavity may act as a waveguide, e.g., an optical waveguide or an electromagnetic waveguide.

The plurality of first holes 108a may be arranged in a first orientation or correspond to a first topology. The plurality of second holes 108b may be arranged in a second orientation or correspond to a second topology. The first orientation (or topology) and the second orientation (or topology) may be different to each other. The first orientation (or topology) and the second orientation (or topology) may be opposite orientations (or topologies), as shown in FIG. 1A as a non-limiting example. The plurality of first holes 108a and the plurality of second holes 108b immediately adjacent to the interface region 114 may be shifted (horizontally) relative to each other.

Each of the plurality of first holes 107a may be an air hole. Each of the plurality of second holes 107b may be an air hole. As non-limiting examples, the plurality of first holes 107a and the plurality of second holes 107b are shown as quasi-hexagonal holes in FIG. 1A.

There may be two valleys (K and K' valleys) in the Brillouin zone of a photonic crystal having associated Chern numbers. For example, at the K' and K valley points of the Brillouin zone of the first domain 112a, the first set of Chern numbers may include respective Chern numbers, $C_{K'}^1$ and $C_K^1$, and at the K' and K valley points of the Brillouin zone of the second domain 112b, the second set of Chern numbers may include respective Chern numbers, $C_{K'}^2$ and $C_K^2$.

In various embodiments, each of the first domain 112a and the second domain 112b may be associated with a first valley (e.g. K valley), and a second valley (e.g., K' valley). The first set of Chern numbers may include a first Chern number (e.g., $C_K^1$) associated with the first valley of the first domain 112a and a second Chern number (e.g., $C_{K'}^1$) associated with the second valley of the first domain 112a. The second set of Chern numbers may include a third Chern number (e.g., $C_K^2$) associated with the first valley of the second domain 112b and a fourth Chern number (e.g., $C_{K'}^2$) associated with the second valley of the second domain 112b.

In various embodiments, the first Chern number and the third Chern number may be different numbers, and the second Chern number and the fourth Chern number may be different numbers.

In various embodiments, the first Chern number and the third Chern number may be opposite numbers. This may mean that the first Chern number and the third Chern number may be of the same absolute number but of opposite signs. The second Chern number and the fourth Chern number may be opposite numbers. This may mean that the second Chern number and the fourth Chern number may be of the same absolute number but of opposite signs. As a non-limiting example, the first Chern number and the third Chern number may be respectively −½ and +½ (or vice versa), and the second Chern number and the fourth Chern number may be respectively +½ and −½ (or vice versa) when the orientation of the plurality of second holes 108b are flipped compared to the plurality of first holes 108a.

In various embodiments, the first Chern number and the third Chern number may differ from each other by an integer, and the second Chern number and the fourth Chern number may differ from each other by an integer.

Each of the plurality of first holes 108a may have a shape with a 120° rotation symmetry arranged in a first orientation, and, each of the plurality of second holes 108b may have the shape with the 120° rotation symmetry arranged in a second orientation. The rotation symmetry occurs at exactly 120.0°. The first orientation and the second orientation may be different to each other. The first orientation and the second orientation may be opposite orientations. The shape may include, but not limited to, a quasi-hexagonal shape or an equilateral triangular shape. The quasi-hexagonal shape may have two immediately adjacent sides of different lengths. As a non-limiting example, the first, third and fifth sides of the quasi-hexagonal shape may be of a first length (e.g., $d_1$), while the second, fourth and sixth sides of the quasi-hexagonal shape may be of a second length (e.g., $d_2$), where the first length and the second length are different lengths. For example, the first, third and fifth sides may be shorter than the second, fourth and sixth sides, or vice versa. Nevertheless, it should be appreciated that other suitable shapes with a 120° rotation symmetry may be employed for the plurality of first holes 108a and the plurality of second holes 108b. It should be appreciated that a shape with a 120° rotation symmetry may mean a shape having symmetry at angles of 0° (or 360°), 120°, 240°.

In order to generate topological protection, a suitable range for each of $d_1$ and $d_2$ may be provided for bandgap formation. This range may be influenced by the specific structure, including, for example, the active region refractive index, active region thickness, etc. Once a suitable condition is met in terms of the structure, providing unequal $d_1$ and $d_2$ leads to different Chern numbers for the first domain 112a and the second domain 112b, and, thus topological edge states appear.

In various embodiments, the optical cavity may include a loop cavity, e.g., a closed loop cavity. This may mean that the interface region 114 may form a (closed) loop.

In various embodiments, the optical cavity may include at least one corner or bend.

In various embodiments, the optical cavity may have a triangular shape or a trapezoidal shape. However, it should be appreciated that the optical cavity may be of any other suitable shapes.

The laser source 100 may further include at least one out-coupling agent (or scattering defect or agent) along the optical cavity. The at least one outcoupling agent may therefore be arranged along the interface region 114. The at least one outcoupling agent may be arranged along a side of the optical cavity or at a corner of the optical cavity. The at least one out-coupling agent may allow for out-coupling of light. The out-coupling agent may be in the form of a hole or aperture, e.g., an air hole. The out-coupling agent may be of any suitable shape, including but not limited to, a rectangle, a square, a triangle or a circle.

The laser source 100 may further include an active medium over (or on) a substrate, the active medium having a first conductive layer arranged proximate to the substrate, a second conductive layer over the first conductive layer, and an active region sandwiched between the first conductive layer and the second conductive layer, and the photonic crystal structure 107 may be formed (or defined) in (or through) the active region and the second conductive layer. Therefore, starting from the substrate, the layers are arranged increasingly away from the substrate in the order of the first conductive layer, the active region and the second conductive layer. The photonic crystal structure 107 may be formed through the entire depth of the active region. The active region may provide optical gain. The active region may include a quantum well or a multiple quantum well structure. Each of the first conductive layer and the second conductive layer may be or may include a metal (layer).

The laser source 100 may further include an optical waveguide optically coupled to the optical cavity.

The laser source 100 may further include at least one (optical) output coupler optically coupled to the optical waveguide. Each of the at least one output coupler may include a grating. A first output coupler may be optically coupled to a first end of the optical waveguide, and a second output coupler may be optically coupled to a second end of the optical waveguide.

The laser source 100 may operate in the mid-infrared and/or terahertz (THz) frequency.

The laser source 100 may include or may be a quantum cascade laser (QCL). For example, the laser source 100 may be a terahertz (THz) electrically-pumped QCL.

FIG. 1B shows a method 120 for forming a laser source, according to various embodiments. The method 120 may include forming a photonic crystal structure including a first domain having a plurality of first holes defined therein, the first domain being associated with a first set of Chern numbers, and a second domain having a plurality of second holes defined therein, the second domain being associated with a second set of Chern numbers, wherein the plurality of first holes and the plurality of second holes are arranged to define an interface region between the first domain and the second domain, the interface region defining an optical cavity for lasing.

Each of the first domain and the second domain may be associated with a first valley and a second valley. The first set of Chern numbers may include a first Chern number associated with the first valley of the first domain and a second Chern number associated with the second valley of the first domain, and the second set of Chern numbers may include a third Chern number associated with the first valley of the second domain and a fourth Chern number associated with the second valley of the second domain.

In various embodiments, the first Chern number and the third Chern number may be opposite numbers, and the second Chern number and the fourth Chern number may be opposite numbers.

In various embodiments, the first Chern number and the third Chern number may differ from each other by an integer, and the second Chern number and the fourth Chern number may differ from each other by an integer.

Each of the plurality of first holes may have a shape with a 120° rotation symmetry arranged in a first orientation, and each of the plurality of second holes may have the shape with the 120° rotation symmetry arranged in a second orientation.

The optical cavity may include at least one corner or bend.

The method may further include forming at least one out-coupling agent along the optical cavity.

The method may further include forming an active medium over a substrate, the active medium including a first conductive layer arranged proximate to the substrate, a second conductive layer over the first conductive layer, and an active region sandwiched between the first conductive layer and the second conductive layer. The photonic crystal structure may be formed in (or through) the active region and the second conductive layer.

It should be appreciated that description in the context of the laser source 100 may correspondingly be applicable in relation to the method 120 for forming a laser source.

Various embodiments or techniques will now be further described in detail by way of the following non-limiting examples and with reference to the figures. While the techniques are described with reference to quantum cascade lasers, it should be appreciated that the techniques may be applied to any types of lasers.

Quantum cascade lasers (QCLs) are electrically-pumped semiconductor lasers based on intersubband electron transitions in semiconductor multi-quantum-wells. QCLs may be used as sources of mid-infrared and terahertz (THz) radiation. QCLs may emit in TM (transverse magnetic) modes. QCLs may include a double-metal waveguide.

Various embodiments may provide a laser having a valley photonic crystal, for example, a quantum cascade laser having a valley photonic crystal. A non-limiting example of a quantum cascade laser that may be suitable for the techniques disclosed herein may be that as illustrated in FIGS. 2A and 2B.

Figure 2B:
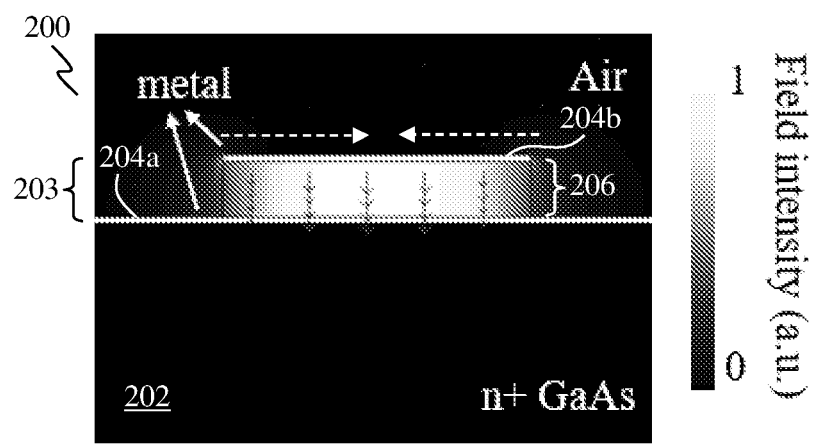
FIG. 2B shows result illustrating the field intensity in a cross-sectional view of the quantum cascade ridge laser.

FIG. 2A shows a schematic perspective view of a quantum cascade ridge laser 200 while FIG. 2B shows result illustrating the field intensity in a cross-sectional view of the quantum cascade laser 200. In FIG. 2B, the dashed arrows indicate the direction of increasing field intensity. The quantum cascade laser 200 may include a substrate 202, for example an n-doped gallium arsenide (n+ GaAs) substrate, and an active medium 203 over the substrate 202. The active medium 203 may include a first conductive layer (e.g., metal) 204a and a second conductive layer (e.g., metal) 204b, with an active region 206 sandwiched in between the conductive layers 204a, 204b. The first conductive layer 204a may be arranged on the substrate 202, proximate to the substrate 202. The active region 206 may be arranged on the first conductive layer 204a. The second conductive layer 204b may be arranged on the active region 206. The first conductive layer 204a may be arranged directly on the substrate 202. The first conductive layer 204a may cover the entire upper surface of the substrate 202. The active region 206 may be the region where light may be generated and/or emitted and/or amplified.

Using the quantum cascade laser 200 as a non-limiting example, in various embodiments, in terms of the valley photonic crystal design, the design may include a triangular lattice of quasi-hexagonal holes drilled into the active medium 203 of the THz QCL wafer, where an air-hole structure with a semiconductor material (active region of QCL) as the background medium may be provided. The theoretical calculations with the refractive index of the semiconductor material correspond to the estimated effective refractive index value of the QCL active region. In various embodiments, the active region 206 may include a quantum well superlattice structure, e.g., having hundreds of periods of GaAs/AlGaAs (gallium arsenide/aluminium gallium arsenide) quantum well superlattice.

Figure 3A:
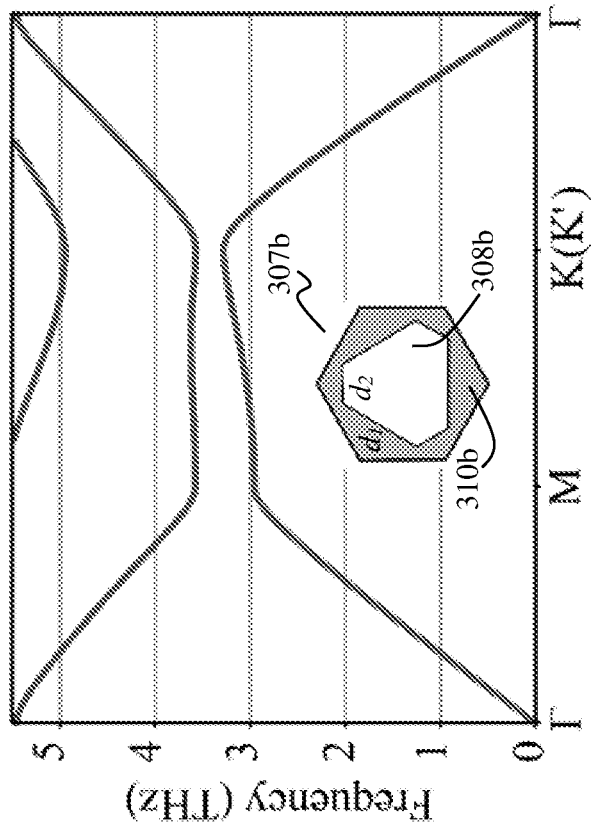
FIGS. 3A to 3D show design of a two-dimensional (2D) valley photonic crystal (VPC).

FIGS. 3A to 3D show design of a two-dimensional (2D) valley photonic crystal (VPC). FIG. 3A shows the two-dimensional (2D) band structure of a triangular-lattice photonic crystal whose unit cell 307a, shown as an inset, includes a regular hexagonal air-hole 308a in dielectric 310a of refractive index 3.6 (the dielectric medium 310a represents the QCL wafer medium of an actual laser device), with unbroken inversion symmetry, illustrating the photonic band structure for the transverse magnetic (TM) modes. Also shown as an inset is the Brillouin zone 309a. The band structure exhibits Dirac points—linear band-crossing points between the two lowest transverse magnetic (TM) photonic bands—at the K and K' points (the corners of the hexagonal Brillouin zone 309a). Near the K (K') point, the Bloch states may be generically described using an effective 2D Dirac Hamiltonian as follows:

$$H = v_D(\pm q_x \sigma_x + q_y \sigma_y)$$ Equation (1), where $\vec{q} = (q_x, q_y)$ is the wave-vector measured from K (K'), $v_D$ is the group velocity, $\vec{\sigma} = (\sigma_x, \sigma_y, \sigma_z)$ are the Pauli matrices with $\sigma_{x,y}$ being the first two Pauli matrices, and the +(−) sign corresponds to the K (K') valley. Valleys refer to the isolated local extrema of a band structure and may be labelled by the corresponding crystal momentum.

As the discussion in the context of FIGS. 3A to 3D relates to that of a photonic structure, the medium 310a may be described as or referred to as a dielectric medium 310a. When discussing, for example, a gain medium, an active region, an active medium, etc., the material is a semiconductor from the perspective of electrons. When a 'dielectric' material is described, discussion relates to the structure design or numerical modelling results from the perspective of photons. As such, a "dielectric" material may be described for the designs disclosed herein, where such designs offer one or more advantageous features over other topological structures using magnetic materials, where a magnetic field is required to be applied for their operations.

Figure 3B:
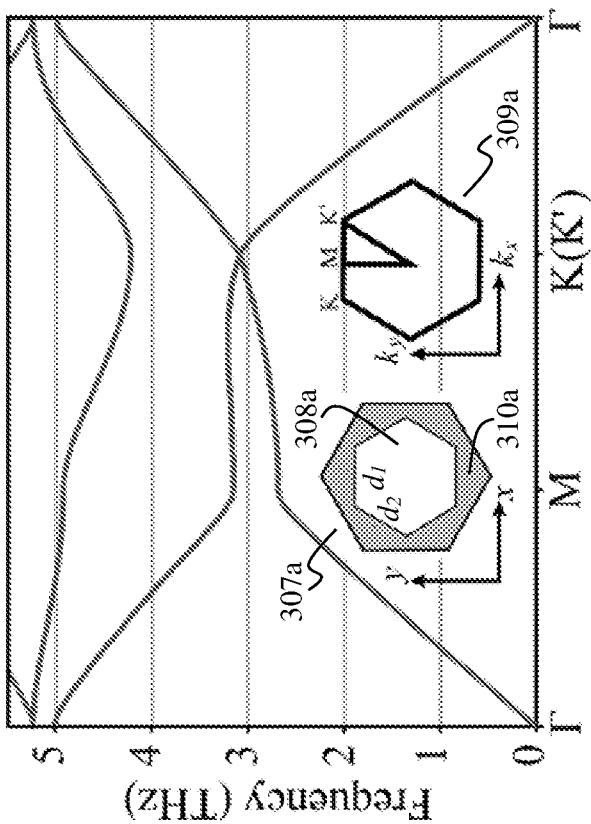
Figure 3D:
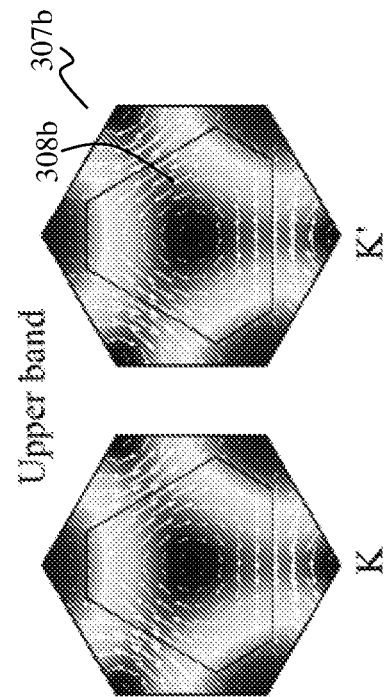
Figure 3C:
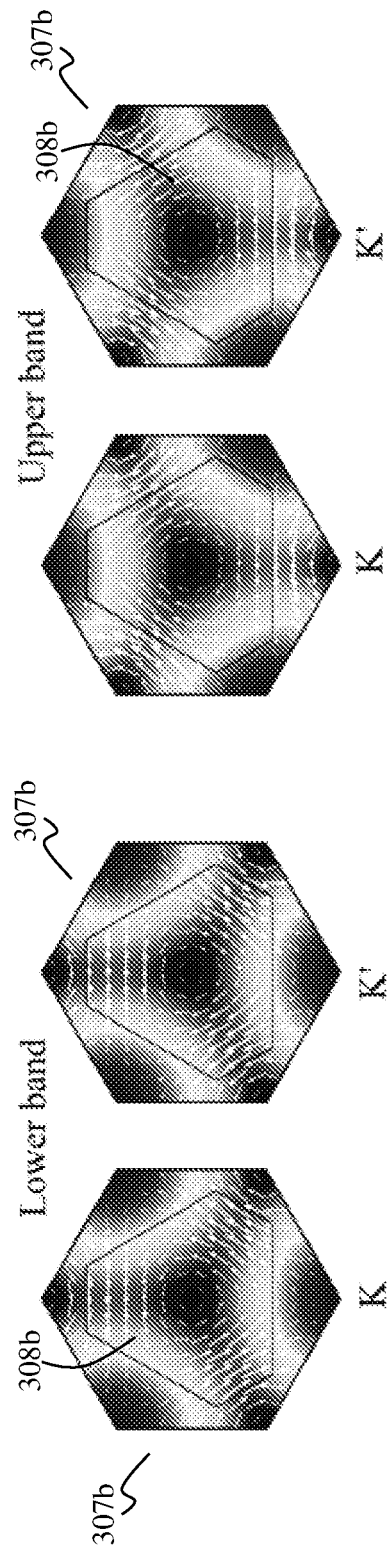
Figures 4A, 4B, 4C:
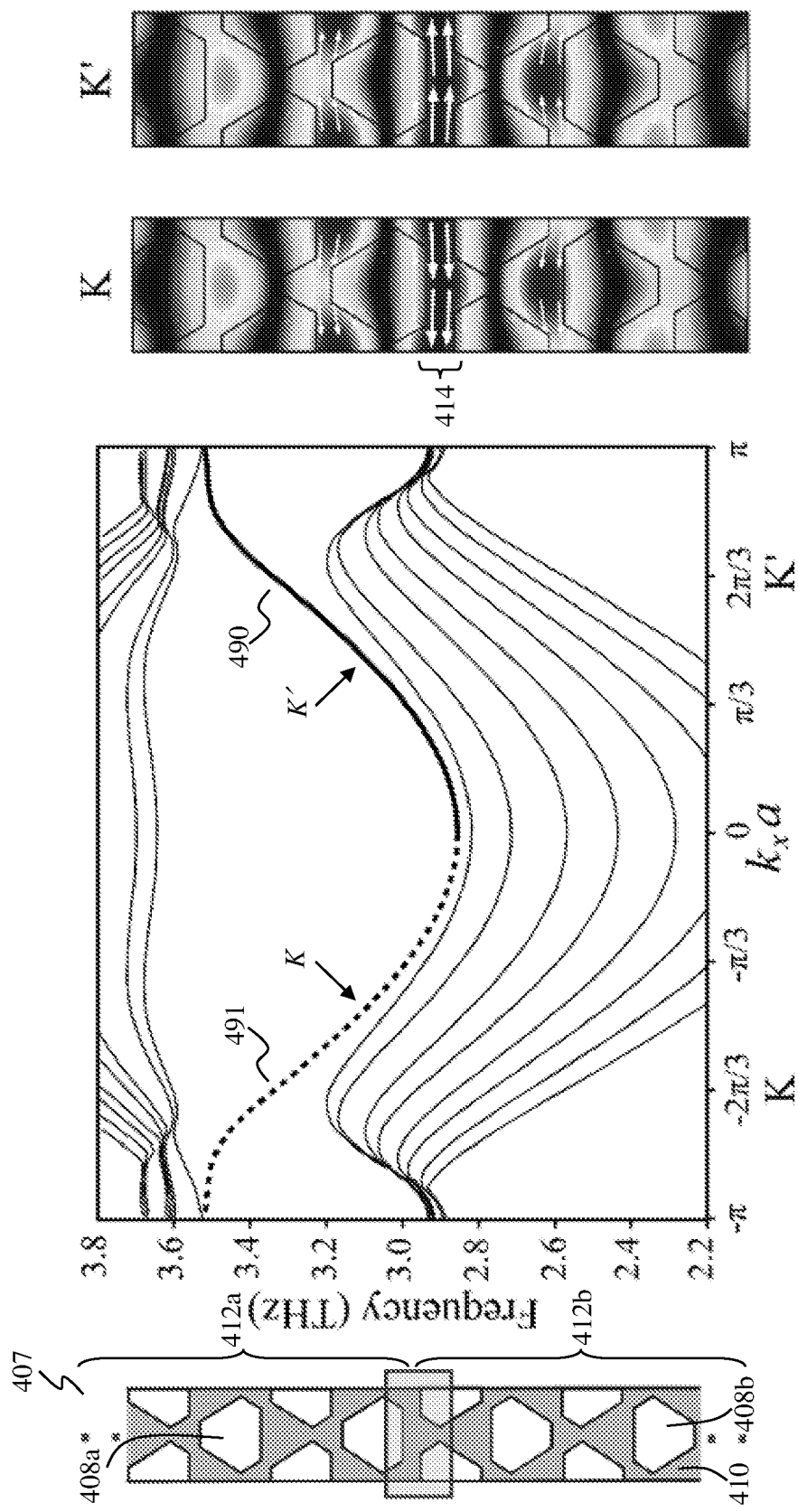
FIGS. 4A to 4C show edge states of a two-dimensional valley photonic crystal (2D VPC) domain wall.

Reciprocal space (also called "k-space") is the space in which the Fourier transform of a spatial function is represented (similarly the frequency domain is the space in which the Fourier transform of a time dependent function is represented). If a function is periodic in real space (e.g., photonic crystals), it's reciprocal space is also periodic and one can define a unit cell in reciprocal space (similar to the unit cell in real space). This unit cell is called Brillouin zone and represented as 309a in the inset of FIG. 3A. M, K and K' are the high symmetry points in the Brillouin zone 309a as indicated in FIG. 3A. The dispersion curves along these high-symmetry points reveal the basic band structures of the lattice. Most of the interesting physics occur along these lines. FIGS. 3C, 3D, and 4C, to be described below, show the mode distributions with its wavevector corresponding to K and K' respectively.

The $C_{3v}$ symmetry of the photonic crystal may be broken while maintaining a unit shape with 120° rotation symmetry by setting $d_1 \neq d_2$. This may lift the degeneracy of the Dirac points, as shown in FIG. 3B. As may be observed, FIG. 3B illustrates the band structure after breaking inversion symmetry by setting $d_1 \neq d_2$, where the band degeneracies (Dirac points) are lifted at K and K'. The inset of FIG. 3B shows a unit cell 307b having a quasi-hexagonal hole 308b with $d_1=0.58a$ and $d_2=0.26a$, with 120° rotation symmetry, in dielectric 310b (e.g., having refractive index 3.6). The M, K and K' points associated with the unit cell 307b may be similar to those associated with the unit cell 307a. As may be observed, FIGS. 3A and 3B show 2D topological photonic crystal lattice having hexagonal air-hole photonic crystal (PC) and deformed hexagonal air-hole PC respectively. The effect of the symmetry-breaking may be modelled as a mass term added in the effective Dirac Hamiltonian as follows:

$$H = v_D(\pm q_x \sigma_x + q_y \sigma_y) + v_D m \sigma_z \quad \text{Equation (2),}$$

where m represents the effective mass of Dirac particles, and $\sigma_z$ is the third Pauli matrix.

Although the band structures for the K and K' points yield identical dispersion relations, they may be topologically distinct. Topology provides a freedom to classify the materials in condensed matter and structural geometries in the field of classic waves. The quantity for this classification is the Chern number, which is different for K and K' points in the Brillouin zone. Therefore, K and K' points are considered different in terms of topology (i.e., topologically distinct) as they carry opposite valley Chern numbers. This may be shown by computing the valley Chern number, defined as $$C_{K/K'} = \frac{1}{2} \iint_{HBZ} \Omega_{K/K'}(\vec{q}) dS, \quad \text{Equation (3)}$$

where $$\Omega_{K/K'}(\vec{q}) = \pm \frac{m}{(m^2 + q^2)^{3/2}}$$

is the Berry curvature for (for example) the lowest band and S refers to the surface area of half of the Brillouin zone (HBZ). The integral may be carried out over half of the Brillouin zone (HBZ) containing K or K'.

The Berry curvature may also be defined as $\Omega = \nabla_k \times A(k)$, where $$\nabla_k = \left(\frac{\partial}{\partial k_x}, \frac{\partial}{\partial k_y}\right).$$

$A(k)$ represents the Berry connection, that is, $A_n(k) = \int_{unit\ cell} d^2 r u_k^*(r) \nabla_r u_k(r)$, where $$\nabla_r = \left(\frac{\partial}{\partial x}, \frac{\partial}{\partial y}\right).$$

and $u_k(r)$ represents the Bloch wavefunctions that may be calculated from numerical simulation.

General photonic crystals or other periodic structures all have a trivial topology with zero Chern number. A common method to find topological edge states is starting from the Dirac point in a 2D dispersion structure, which may be interpreted as a phase transformation point from a trivial to a non-trivial topology. Parity inversion (P-) symmetry and time-reversal (T-) symmetry are required for Dirac points to stably exist in two dimensions. Breaking either T-symmetry or P-symmetry may make the two bands split apart and gain a non-zero Chern number. In various embodiments, the P-symmetry (inversion symmetry) may be broken to obtain the non-trivial topology with a non-zero Chern number. The band degeneracies is lifted at K and K' due to this inversion symmetry breaking.

Figure 3F:
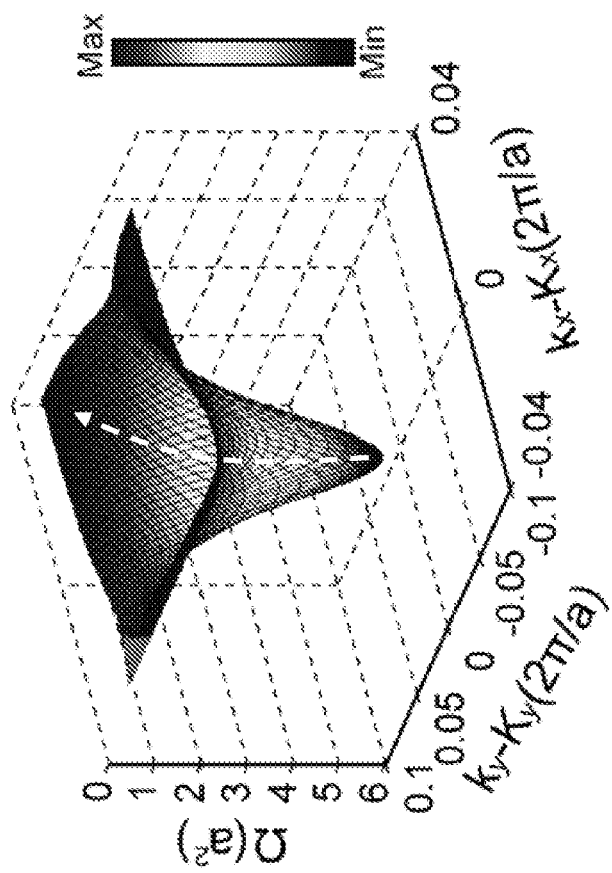
FIGS. 3E and 3F show the Berry curvatures calculated using 2D Bloch wavefunctions for the lowest TM band near the K' valley and near the K valley respectively of the valley photonic crystal (VPC) structure.
Figure 3E:
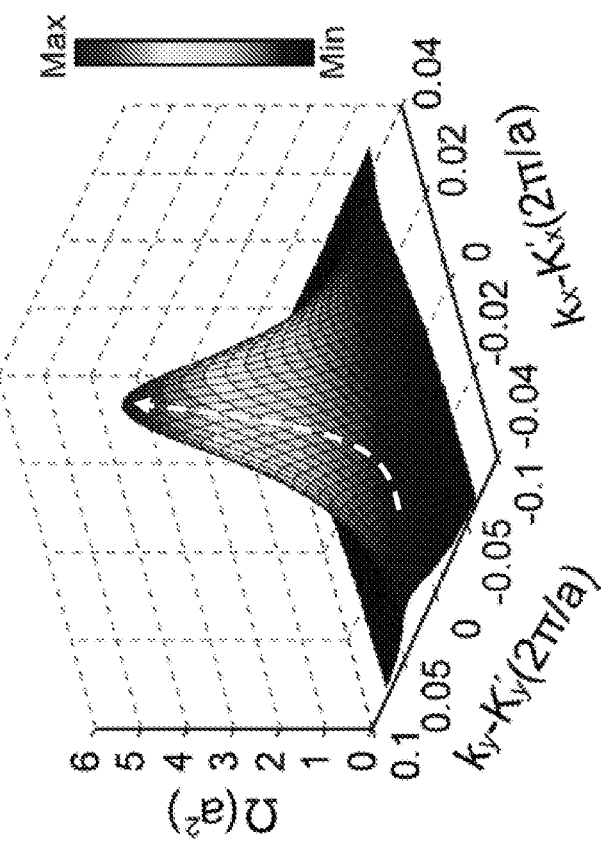

FIGS. 3E and 3F show the numerically calculated Berry curvature near the K' and K points respectively. The dashed arrows in FIGS. 3E and 3F show the directions, based on the legends, from "Min" to "Max".

The opposite signs in the Berry curvature at K and K' result in opposite valley Chern numbers $C_K = \frac{1}{2}$, $C_{K'} = -\frac{1}{2}$. Rotating the quasi-hexagonal motif by 180° is equivalent to flipping the sign of the mass parameter, m, which flips the signs of the valley Chern numbers.

FIGS. 3C and 3D show plots of the absolute values of the out-of-plane electric field, $|E_z|$ (heat maps) and Poynting vector (represented by the white arrows) within each VPC unit cell 307b (with quasi-hexagonal hole 308b) at the K and K' points for both the lower band (see FIG. 3C) and the upper band (see FIG. 3D). The modes in the two valleys (corresponding to K and K') are time-reversed counterparts, as shown by the opposite circulations of electromagnetic power. This circulation direction may be reversed by switching $d_1$ and $d_2$ (i.e., rotating the motif by 180°). In FIGS. 3C and 3D, the real space field distribution within one unit cell is plotted. In momentum (k) space, these modes correspond to K and K', respectively. For each point in the reciprocal (k) space, one gets a number of allowed frequencies and corresponding modes (electric field distribution within unit cell) by solving Maxwell's equations. K and K' points are two particular points in k space (which are called valleys) and the two lowest modes at these two points are plotted.

Disclosure is provided herein in relation to the K and K' points as the techniques disclosed herein exploit the non-trivial topology of the valleys occurring at K and K' points of a photonic crystal (e.g., triangular photonic crystal). States around these valleys carry topological charge (called valley Chern number) and an interface of two photonic crystals of opposite topological charges (for same valley) may host edge states with frequencies in the gap according to "bulk-boundary correspondence". These edge states are locked to corresponding valleys and may propagate along the interface without back-scattering in the presence of sharp bending without being localised or creating standing waves. These valley-locked edge states are used in devices such as lasers and may lead to robust operation. The states around M and Γ do not carry topological charge and therefore, cannot find corresponding edge states.

With hexagonal holes, the lattice would be inversion-symmetric, and its band structure would have Dirac points at the Brillouin zone corners (K and K'). By assigning unequal wall-length parameters $d_1$ and $d_2$, the inversion symmetry is broken, and bandgaps open at K and K'. Assuming negligible coupling between the K and K' valleys, the two gaps are associated with opposite Chern numbers $\pm\frac{1}{2}$, meaning that they are topologically inequivalent. The Chern numbers switch sign upon swapping $d_1$ and $d_2$ (that is, flipping the hole orientations).

FIGS. 4A to 4C show edge states of a two-dimensional valley photonic crystal (2D VPC). FIG. 4A shows a portion of a photonic crystal having two domains 412a, 412b with opposite valley Chern numbers. The photonic crystal includes a supercell 407 including two inequivalent VPC domains 412a, 412b separated by a domain wall (highlighted with a rectangle in FIG. 4A). The domain wall is the region or interface between the two domains 412a, 412b. As shown in FIG. 4A, the domain 412a includes a plurality of quasi-hexagonal holes 408a, and the domain 412b includes a plurality of quasi-hexagonal holes 408b, where the holes 408a, 408b are defined in a dielectric 410 (see discussion above relating to a "dielectric" material). The set of quasi-hexagonal holes 408a and the set of quasi-hexagonal holes 408b are arranged in opposite orientations to one another. In the two valleys (K and K' valleys), the differences in Chern number between the two domains are $\Delta C_K = C_K^1 - C_K^2 = -1$; $\Delta C_{K'} = C_{K'}^1 - C_{K'}^2 = 1$; where superscripts 1, 2 correspond to first domain (e.g., 412a) and second domain (e.g., 412b), respectively. Thus, while not wishing to be bound by any theory, based on the topological bulk boundary correspondence principle, there shall be (net) one forward-propagating edge state in the K' valley, and one backward-propagating edge state in the K valley. This may be verified by the numerically calculated photonic band structure shown in FIG. 4B.

FIG. 4B shows the projected band diagram for the supercell 407. In FIG. 4B, the thick solid curve 490 represents the forward propagating valley edge mode for the K' valley, while the thick dashed curve 491 indicates the backward propagating valley edge mode for the K valley. The remaining curves (i.e., the thin solid curves) represent bulk states which are extended over the bulk region of the photonic crystals.

FIG. 4C shows the out-of-plane electric field $|E_z|$ (heat maps) and Poynting vector (represented by the white arrows) for the edge modes at K and K'. The field plots in FIG. 4C show that the edge states, in other words, the corresponding forward-propagating edge state and backward-propagating edge state, are strongly localised to the domain wall 414, that is, between the two domains with opposite valley Chern numbers. As shown in FIGS. 4A to 4C, the edge states may be supported by two opposite photonic crystal domains 412a, 412b. The frequencies of the edge states are within the band gap region of bulk photonic crystals in two sides, which may forbid mode propagation into the bulk region of the photonic crystal. Therefore, the edge states may be localised at the interface, i.e., at the domain wall 414.

To achieve topological lasing based on valley edge states, the 2D VPC may be integrated, for example, onto a THz QCL wafer with a double-metal waveguide, which may be similar to the quantum cascade laser 200 of FIG. 2A. The edge states may be locked to the valleys, i.e., K and K', and hence they are called valley edge states. The edge states may exist where the valley Chern number of the two crystal domains at two sides of the interface differ by an integer. This non-zero valley Chern number may be achieved by breaking inversion symmetry within the unit cell.

Figure 5A:
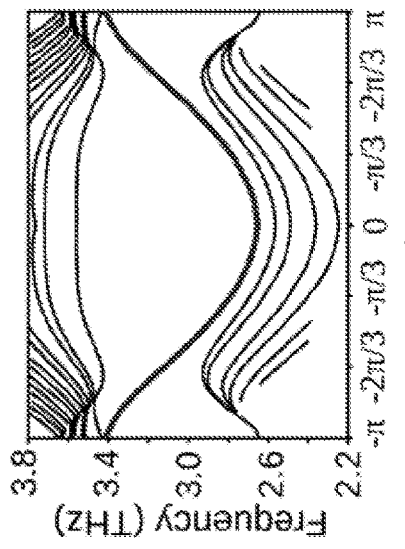
FIGS. 5A to 5E show design of a terahertz (THz) quantum cascade laser (QCL) with topologically protected valley edge modes, according to various embodiments.

FIGS. 5A to 5E show the design of a terahertz (THz) quantum cascade laser (QCL) with topologically protected valley edge modes. As shown partially in FIG. 5A, the waveguiding (or active medium) scheme may have a first conductive (or metal, e.g., gold (Au)) layer 504a, an active region 506 on the first conductive layer 504a, and a second conductive (or metal, e.g., gold (Au)) layer 504b on the active region 506. The active region 506 may include a semiconductor layer or a semiconductor layer arrangement (with multiple layers). While FIG. 5A shows a unit cell 507 with a hole 508, it should be appreciated that a plurality of holes 508 with unequal wall-length parameters (e.g., $d_1=0.58a$ and $d_2=0.26a$, and $a=19.5$ μm, where a is the lattice period, defined from centre-to-centre of adjacent holes 508), the basis of 2D VPC, may be formed in the second conductive layer 504b and the active region 506 of the waveguide as shown in FIG. 5A for a unit cell. As may be observed, each unit cell 507 of the valley photonic crystal may include a quasi-hexagonal hole 508 perforated through the top metal layer 504b and the semiconductor layer of the active region 506 (e.g., through the entire depth of the semiconductor layer of the active region 506) on a metal-semiconductor-metal heterostructure.

Figure 5B:
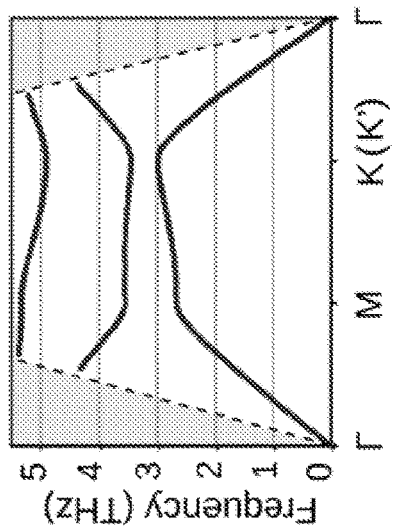

The full-structure photonic band diagram may be characterised using three-dimensional (3D) finite-element simulations, where a 10 μm thick QCL medium (as the active region 506) may be modeled as a lossless dielectric material, sandwiched between metal layers (corresponding to layers 504a, 504b) modelled as perfect electrical conductors. The effective refractive index of the active region 506 contains real and imaginary parts, both of which may be slightly changed when current flows through the material. For simplicity, only the real part of the effective refractive index is considered for qualitive understanding of the structural properties. The imaginary part mainly contributes to the loss of eigenmodes, and plays a trivial role on the alteration of mode distributions. With a lattice period $a=19.5$ μm, the bulk band diagram may have a gap from 2.99 to 3.38 THz considering the effective refractive index of QCL medium is estimated to be 3.6, as may be observed in FIG. 5B illustrating the band structure calculated by 3D finite-element simulation. The band gap may be scaled to other laser systems with different active materials and operating frequency ranges by altering the lattice periods. Lasers (e.g., semiconductor lasers) may operate in the frequency range from UV ($10^{15}$ Hz) to the THz ($10^{12}$ Hz) frequency range, depending on the active material that is used. Designs may be translated to different frequencies using the linear scaling law $a_1 n_{\textit{eff}1} f_1 = a_2 n_{\textit{eff}2} f_2$, where a is the lattice period, $n_{\textit{eff}}$ is the effective refractive index (which may be estimated according to the exact material used) and f is the operating frequency.

Figure 5C:
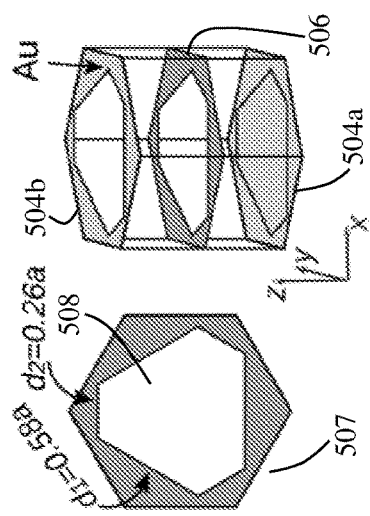

For a straight boundary (e.g., straight waveguide) between domains of opposite hole orientations, the 3D projected band diagram may have a gap spanned by boundary states or edge states with opposite group velocities in each valley, as shown in FIG. 5C (see also FIGS. 3A to 3F, 4A to 4C, and FIGS. 5F and 5G to be described below) which illustrates the projected band diagram for a supercell representing a straight domain wall separating two domains with opposite hole orientations, with 10 quasi-hexagonal holes on each side. These states are topologically protected provided the inter-valley scattering may be negligible; this limitation may be due to the overall T symmetry of the VPC, and similar limits apply to other photonic topological edge states at THz or higher frequencies not relying on magnetic materials. T-symmetry or time reversal symmetry states that the laws of physics remain unchanged under the transformation of time reversal. T-symmetry for light follows from Maxwell's equations and unless one uses a special design to break T-symmetry intentionally (e.g., uses synthetic magnetic field or gyromagnetic materials), T-symmetry is intrinsically not broken in dielectric structures (see discussion above relating to a "dielectric" material). It should be appreciated that, apart from straight boundaries, the techniques disclosed herein may employ non-straight boundaries, as will be described below in relation to FIGS. 5D and 5E using a waveguide with a sharp corner.

Figure 5E:
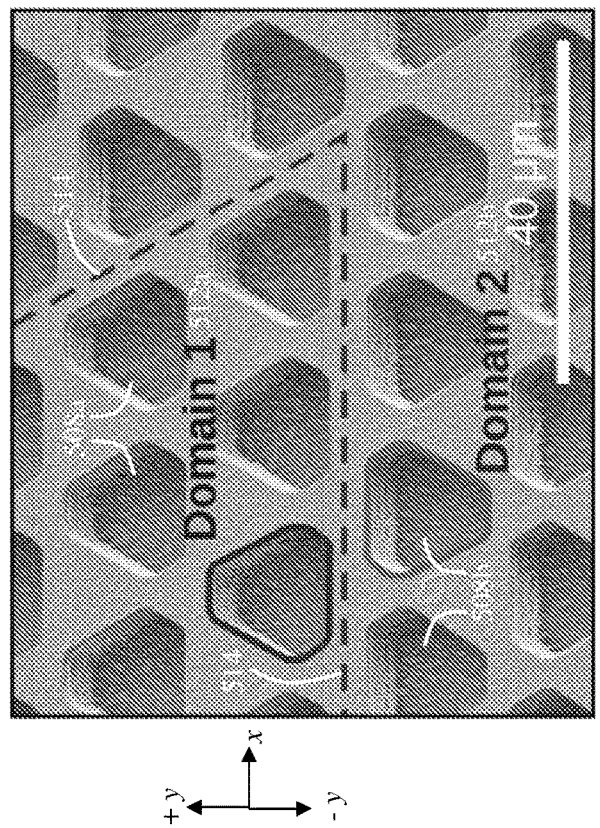
Figure 5D:
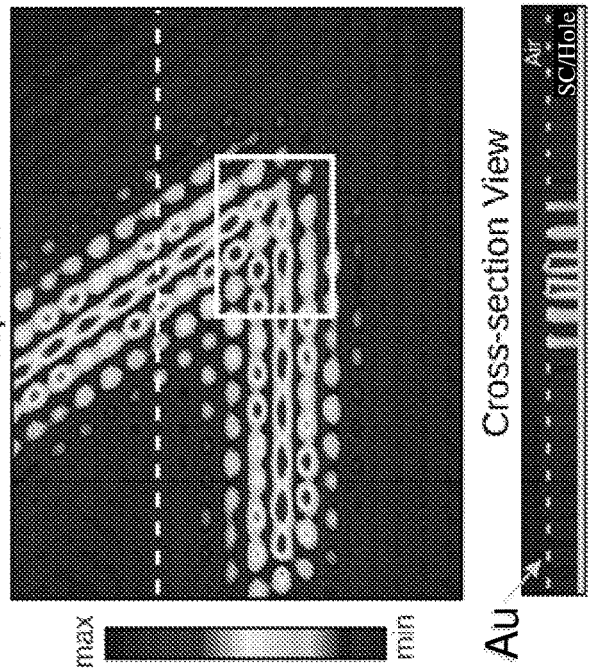

FIG. 5D shows the simulated electric field distribution (|Ez|) (top view and cross section view) of a transmission mode in a topological waveguide with a 120° corner. These are simulation results in which a wave launched at mid-gap frequency crosses a 120-degree corner with negligible backscattering (see FIG. 5E for a scanning electron microscope (SEM) image of such a corner in a sample). The white dashed line in the top view indicates the position for the cross-section view. "SC" in the cross-sectional view refers to semiconductor. As may be observed in FIG. 5D, the edge modes may propagate through the sharp corner with negligible backscattering (see white rectangle in FIG. 5D), thus offering topological protection. FIG. 5E shows a scanning electron microscope (SEM) image of a portion of a fabricated topological waveguide near the corner (taken from the top at an oblique angle), corresponding to the area enclosed by the white rectangle in FIG. 5D. Two domains, namely domain 1 512a and domain 2 512b, may be observed. (Quasi-hexagonal) Holes 508a in the first domain 512a and (quasi-hexagonal) holes 508b in the second domain 512b have opposite orientations, and thus are associated with or define opposite valley Chern numbers. The dashed line 514 in FIG. 5E represents the interface between the domains 512a, 512b. In other words, the dashed line 514 represents the domain wall. Referring to FIGS. 5D and 5E, near the domain wall 514, the electric fields may be concentrated in the QCL medium, which is favourable for lasing. From FIGS. 5D and 5E, the results show that interface(s) between regions or domains with different hole orientations (in other words, the domain wall) may act as efficient electromagnetic waveguide(s).

It should be appreciated that, in various embodiments, different shapes having 120° rotation symmetry may be used for the plurality of holes. Such shapes may include, but not limited to, a quasi-hexagonal and an equilateral triangle. The 120° rotation symmetry provides a basic symmetry of the valley photonic crystal with unit cells arranged in a triangular array so as to preserve the symmetry of the bulk photonic crystal as well as to preserve the valleys. A regular hexagon has 120° rotation symmetry but it leads to a Dirac cone dispersion with no bandgap, and such a structure having regular hexagon holes cannot support edge states. As such, a photonic crystal with hexagonal air-holes has inversion symmetry and, hence, a trivial topology (Chern number=0). The waveguide formed by such a structure cannot support edge states, where the results are similar to those shown in FIGS. 9B to 9D.

Figure 5F:
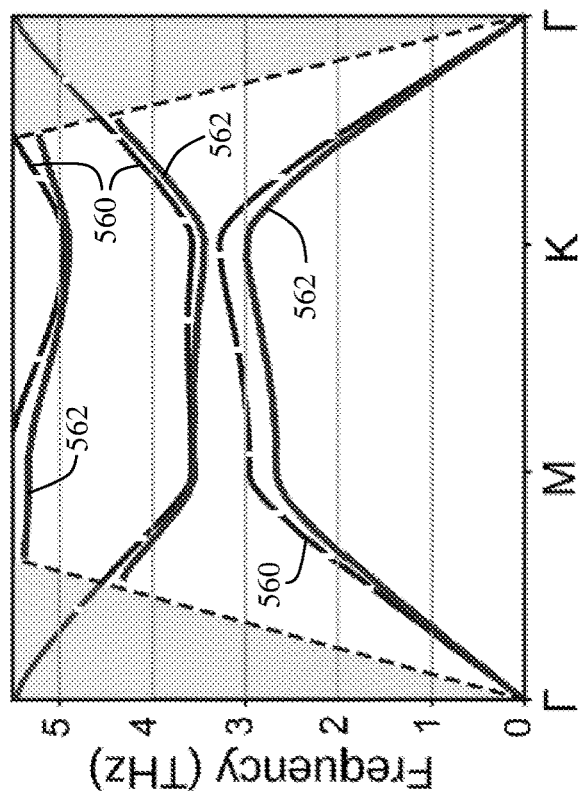
FIGS. 5F and 5G show comparison between 2D and three-dimensional (3D) TM (transverse magnetic) photonic band structures of bulk VPC and VPC domain wall, respectively.
Figure 5G:
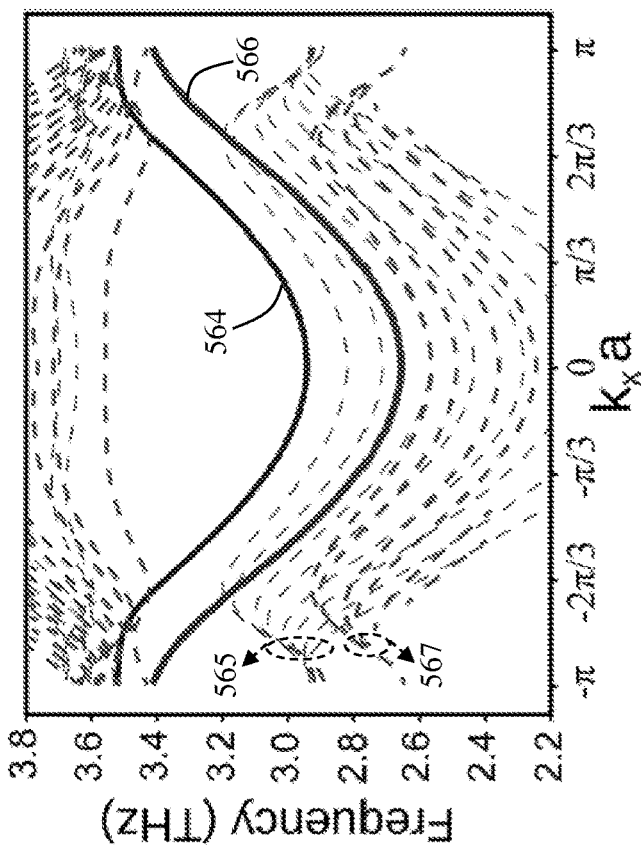

Comparison may be carried out for 2D and 3D band structures. FIG. 5F shows the bulk band structures of the 2D VPC (see dashed curves 560) and 3D VPC (see solid curves 562). The shaded regions delimited by straight dashed lines denote the light cone. The 2D VPC may be regarded as infinite in the out-of-plane (z) direction. The 3D VPC may be modelled based on metal-semiconductor-metal heterostructure with a central semiconductor thickness of 10 µm. FIG. 5G shows the projected band diagrams for a topological waveguide in 2D (see solid curve 564 and thin dashed curves 565 towards the top and bottom of FIG. 5G) and 3D (see solid curve 566 and thick dashed curves 567 towards the top and bottom of FIG. 5G). The lattice configuration is the same as in FIG. 4A, with 10 quasi-hexagonal holes on each side of the domain wall. The edge states are plotted as solid curves 564 (for 2D), 566 (3D) for clarity.

In a 2D VPC with parameters as described herein, the bulk TM band structure may have a bandgap from 3.23 THz to 3.51 THz (the relative bandwidth of around 8%), as shown by the dashed curves 560 in FIG. 5F. For a 2D structure with two domains of opposite hole orientations separated by a straight domain wall (such as shown in FIG. 4A), the projected bandgap occupies a similar frequency range, and the valley edge states traverse the whole projected bandgap as shown by the curves 564, 565 in FIG. 5G.

For an actual device, the VPC is 3D, patterned onto a THz QCL wafer in a metal-semiconductor-metal configuration. The active medium is 10 µm thick, sandwiched between two metal plates to ensure subwavelength vertical confinement of the TM-polarized lasing waves within the active layer. Numerical results for the 3D structure are shown by the solid curves 562 (FIG. 5F) and curves 566, 567 (FIG. 5G). The band structure and projected band diagram are shifted to lower frequencies, but otherwise remain qualitatively similar.

Referring to FIG. 5E and the directions denoted by the arrows, it may be observed that the holes 508a of the first domain 512a immediately adjacent to the domain wall 514 and the holes 508b of the second domain 512b immediately adjacent to the domain wall 514 are offset or shifted relative to each other in the x-direction (horizontal). However, it should be appreciated that the holes 508a or the holes 508b immediately adjacent to the domain wall 514 may be translated along the x-direction by a half lattice constant so that the holes 508a or the holes 508b immediately adjacent to the domain wall 514 may be coaxially aligned to one another, meaning that respective holes 508a, 508b may be directly facing each other or the central axes of the respective holes 508a. 508b may be coaxially aligned. Such a translation does not change any bulk topological property. Further, in some embodiments, a single line of holes 508a and a single line of holes 508b immediately adjacent to the domain wall 514 may be provided, with no further holes provided in the +y- and −y-directions. The edge states are localised exponentially at the edge or the domain wall 514 with some finite penetration depth into the bulk. Sufficient space should be provided to account for this penetration depth so that waves, e.g., at different arms of the triangular cavity, do not interfere with one another. Layers of air-holes more than the penetration depth may be provided for defining the sufficient space.

While the techniques are described herein in relation to two domains having holes of different or opposite orientations, as topological protection of edge states is provided by the distinct topology of bulk photonic crystals, more than two domains with (alternating) opposite orientations may be provided. However, the domain size should be large enough to restore the bulk property. This means that the domain walls, corresponding to different sets of domains, should be far enough from each other (e.g., roughly no less than 8 periods).

As a non-limiting example, a lattice of quasi-hexagonal holes have been patterned onto a THz QCL wafer, with a domain wall forming a triangular loop of side length 21a. The device fabrication process will be described further below. FIG. 6A shows an SEM image of a fabricated THz QCL, with a magnified view of a portion of the fabricated quasi-hexagonal holes 608a, 608b. Also shown as an inset is a schematic cross-sectional view of the holes 608a, 608b, where the active region that is sandwiched between two conductive layers has a height of about 10 µm. As may be observed, the optical cavity, defined by the domain wall 614, may include an in-plane triangular loop of side length 21a. There is a first domain 612a (the area inside of the dashed line 614) with holes 608a and a second domain 612b (the area outside of the dashed line 614) with holes 608b. The holes 608a, 608b in the two domains 612a, 612b have opposite orientations to each other. The dashed line 614 represents the domain wall between the two domains 612a, 612b. The black rectangle 618 indicates a defect (e.g. 39 µm×33.5 µm) etched entirely through the active medium of the THz QCL. The pump region 620 (the shaded area bounded by dashed lines 616a, 616b) may be pumped by electrical injection, while the other areas or parts are passive. The pump region 620 may be defined by depositing and patterning a layer of insulator (e.g., $SiO_2$) at the bottom of the top conductive (or metal) plate, except in the pump region 620. Current may be injected to the active region within the pump region 620 and therefore supply gain to the operating frequencies. In the other areas, the insulator layer blocks the current injection to the underneath active region, and therefore, these areas are passive.

By design, the QCL wafer's gain bandwidth (~2.95-3.45 THz; see FIGS. 12A and 12B and related description below) overlaps the photonic bandgap. As a non-limiting example, electrical pumping is applied only to the nearest three lattice periods on each side of the domain wall 614, to avoid or minimise supplying gain to bulk modes and to achieve low total pump current. The in-plane modes may be vertically outcoupled by scattering via the air holes drilled through the top metal plate and the QCL active region (and via the defects described below). Calculating the eigenmodes with realistic material losses (~20 $cm^{-1}$) in the unpumped portion of the QCL medium, regularly spaced high Q (quality factor) eigenmodes may be observed at frequencies matching the previously-computed bandgap, as shown in FIG. 6B illustrating the calculated quality (Q) factors of the structure's eigenmodes, with realistic material absorption losses (~20 $cm^{-1}$) within the passive region. To reduce computational workload, eigenmodes may be computed for a slightly smaller structure with several outermost unit cells removed, but with the triangular loop cavity left unchanged. The shaded area in FIG. 6B indicates the photonic bandgap of the valley Hall lattice. The regular spacing is a signature of extended modes circulating around the triangular loop, analogous to whispering-gallery modes on a disk or running-wave modes in a ring cavity. Close examination reveals that the eigenmodes include near-degenerate pairs, which are edge state pairs of opposite valley polarisation and circulation direction, as verified from the modal intensity profiles (see FIG. 8A to be described below). There is a slight mismatch in the free spectral range (FSR), likely due to dispersion at the triangle corners. The valley edge eigenmodes may have substantially higher Q than both the bulk modes and the co-existing non-topological defect modes in the upper portion of the bandgap.

FIG. 6C shows experimentally measured lasing spectra for the structure shown in FIG. 6A for two representative pump currents. The plots show the emission spectra for the QCL without (top) and with (bottom) a scattering defect. Straight vertical lines shown in FIG. 6C indicate the peak frequencies of the defect-free QCL, which correspond closely to those of the QCL with a defect. It should be noted that the upper and lower plots use different vertical scales. Peaks at 3.192, 3.224, 3.258, and 3.288 THz (indicated with the solid vertical lines) may be observed, which are regularly-spaced with average FSR only ~4% smaller than in the eigenmode simulations. The intensities are very low, due to poor outcoupling (the valley edge modes lie near K and K', below the light cone). To improve outcoupling efficiency, a small rectangular defect (scattering defect) is introduced, approximately 2a long and $\sqrt{3}$a wide, drilled through the top metal plate and the active medium on one side of the triangle, as shown in FIG. 6A. The resulting spectra are shown in the bottom plots of FIG. 6C. The peak intensities are enhanced by over 20 times, whereas their frequencies are shifted only slightly relative to the original device (without defect). The preservation of the peak frequencies indicates that the defect does not or may not spoil the running-wave character of the lasing modes.

Generally, a (scattering or outcoupling) defect may introduce out-of-plane scattering momentum. Therefore, more light may be scattered out into the free space. The defect may, for example, be an air hole which may be fabricated simultaneously with other quasi-hexagonal air holes through the etching process. Defects of other shapes, such as a triangle or a circle, with similar size as that described above in relation to the rectangular defect, may also be suitably introduced. Further, it should be appreciated that different forms of defects may be introduced, including, for example, in terms of size non-uniformity or positional dislocation of some units, or dust particles.

Figure 7A:
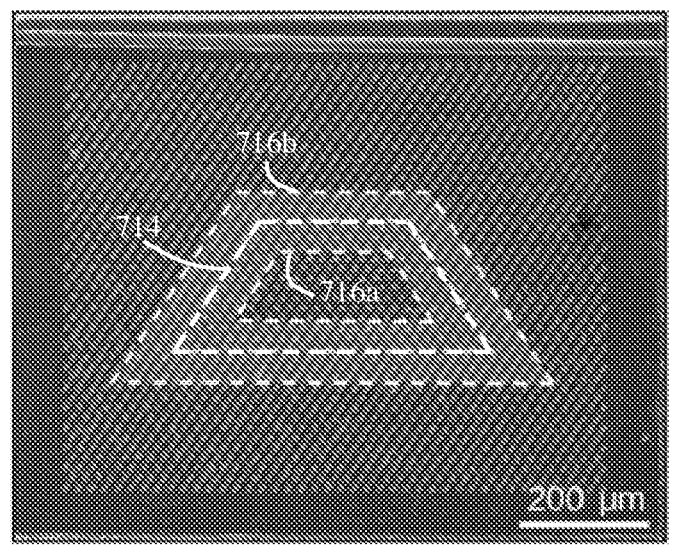
FIGS. 7A and 7B show fabrication and characterisation of a topological terahertz quantum cascade laser (THz QCL), according to various embodiments.
Figure 7B:
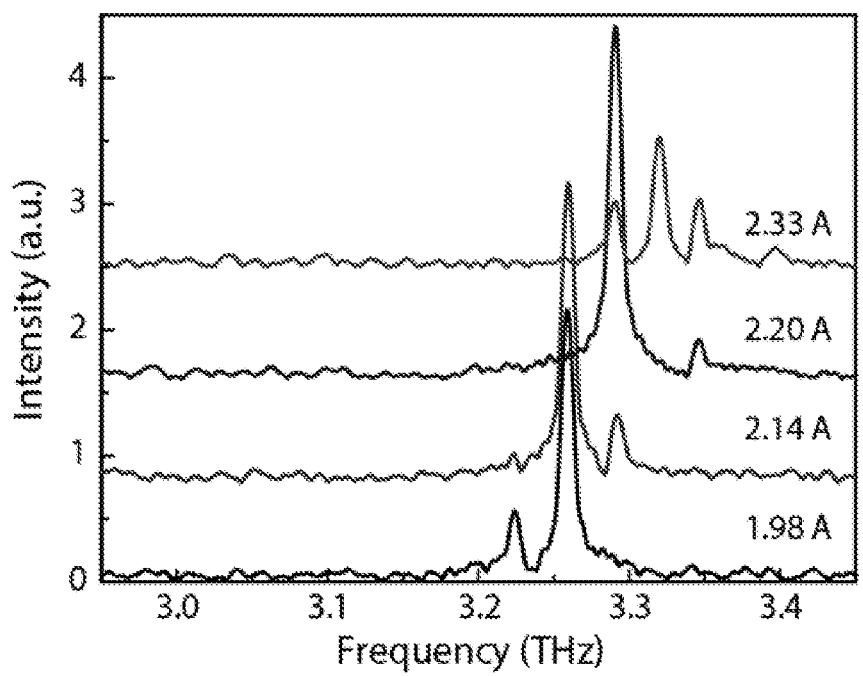

FIG. 7A shows an SEM image of a fabricated THz QCL having a lattice of quasi-hexagonal holes patterned onto a THz QCL wafer, with a domain wall forming an in-plane trapezoidal loop. There is a first domain (the area inside the dashed line 714) with holes and a second domain (the area outside the dashed line 714) with holes. The holes in the two domains have opposite orientations to each other. The dashed line 714 represents the domain wall between the two domains. The pump region (the shaded area bounded by dashed lines 716a, 716b) may be pumped by electrical injection, while the other areas are passive. FIG. 7B shows experimentally measured lasing spectra for the structure shown in FIG. 7A for four different pump currents (vertically shifted for clarity), where several peaks may be observed.

The structures shown in FIGS. 6A and 7A, with a triangular topological cavity and a trapezoid topological cavity, have comparable cavity size. The results of FIGS. 6C and 7B show close peak positions with comparable peak spacings. The results obtained for both the triangular and trapezoid topological cavities show that the lasing modes are running-wave modes which bypass sharp corners, regardless of the cavity geometry. It should be appreciated that the lasing cavity may include a loop cavity and may be of any suitable shapes, including, for example, a square, a rectangle, any polygonal shape or any topological design that may allow for arbitrary bend angles. The cavity may have one or more corners. The emission property is expected to be similar to that of the triangular cavity based on valley photonic crystals as described herein.

Figures 8A, 8B, 8C:
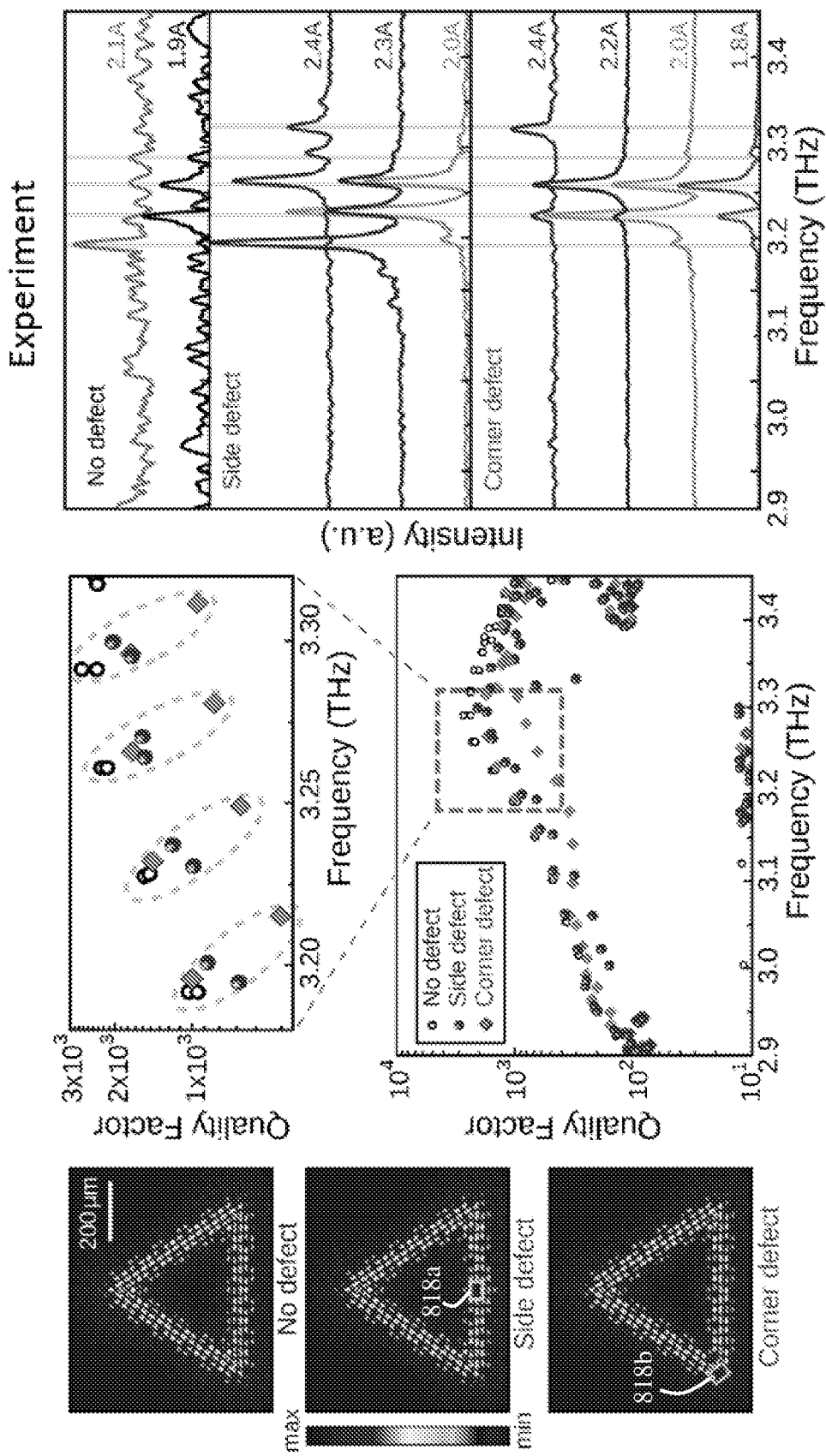
FIGS. 8A to 8C show emission characteristics of topological lasers with different defect configurations, according to various embodiments.

Numerical and experimental comparisons between having no defect, a defect on one side of the triangle, and a defect at one corner of a triangular cavity may be performed. FIG. 8A shows eigenmode electric field ($|Ez|$) profiles at around 3.23 THz, for a structure with no outcoupling defect (see top image of FIG. 8A), a structure with a side defect 818a (see middle image of FIG. 8A), and a structure with a corner defect 818b (see bottom image of FIG. 8A). As may be observed in FIG. 8A, the simulated intensity profiles are at least substantially similar in all cases. FIG. 8B shows the calculated Q factors of the eigenmodes with and without a defect, while FIG. 8C shows the measured emission spectra (vertically offset with increasing pumping intensities/currents), for different pump currents, for QCL devices with no outcoupling defect (see top panel of FIG. 8C), with a side defect (see middle panel of FIG. 8C), and with a corner defect (see bottom panel of FIG. 8C). The vertical lines in FIG. 8C indicate the peak frequencies of the defect-free QCL, which correspond closely to those of the QCL with a defect.

Referring to FIG. 8A, the eigenmode field distribution shows uniform electric field intensities along the domain wall, even at the sharp corners. The extended nature of the computed eigenmodes may be quantified by showing that they have significantly lower inverse participation ratios along the domain wall, indicating less mode localisation, compared with the eigenmodes of a known photonic crystal cavity of similar shape and size (see also FIGS. 13A to 13F to be described further below).

Referring to FIG. 8B, the results show that the corner defect 818$b$ may induce larger frequency splittings between eigenmode pairs, larger blueshifts relative to the defect-free case, and reduced Q factor. The splitting between eigenmode pairs is not observed in the experimental spectra, possibly due to mode competition unaccounted for by the linear eigenmode analysis. The corner defect 818$b$ may yield an overall higher power level and regularly-spaced peaks that are close to the no-defect and side-defect cases, in agreement with simulations. Similar and regular results may be reproduced in other batches of samples as described herein. The results of FIGS. 8A to 8C show various embodiments offer robustness against various defects (e.g., in terms of mode distribution, peak position, peak spacing).

Figure 8E:
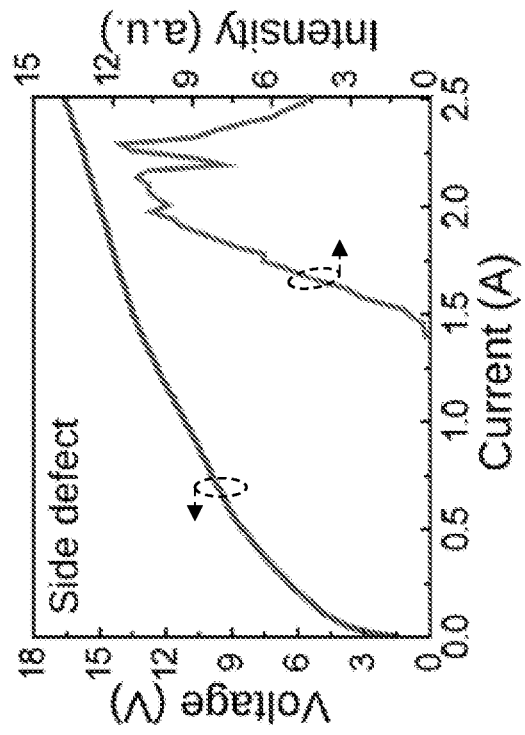
FIGS. 8D to 8F show light-current-voltage curves of topological lasers with different designs.
Figure 8D:
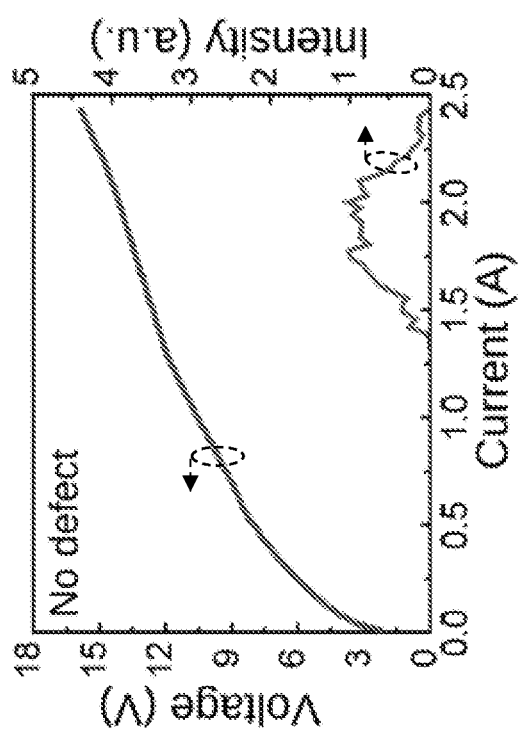
Figure 8F:
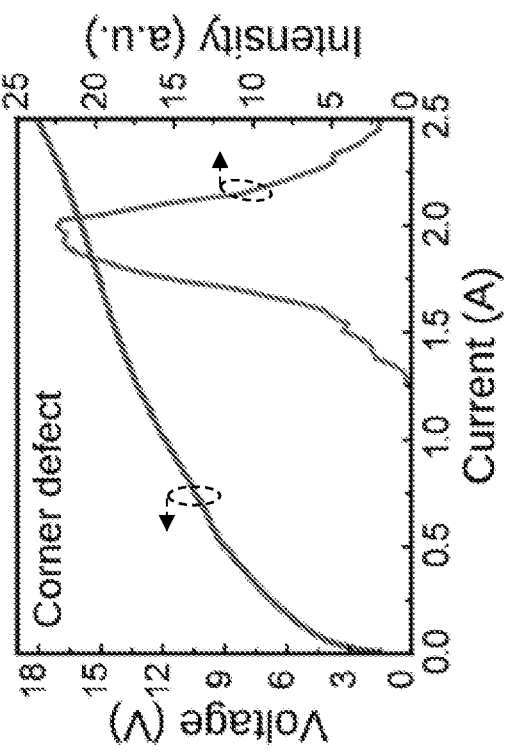

The regular spacing of the extended eigenmodes is a signature of running modes circulating around the triangular loop, analogous to whispering-gallery modes in a disk or a ring cavity. This is a feature imparted by the non-trivial topology of the VPC. The upper panel of FIG. 8C (labelled 'No defect') shows the experimentally measured emission spectra for this structure at two representative pump currents. There are regularly spaced peaks at 3.192 THz, 3.224 THz, 3.258 THz and 3.288 THz (corresponding to vertical lines indicated in FIG. 8C); the average free spectral range (FSR) is comparable to the FSR in the eigenmode simulations. The intensities are fairly low, owing to poor vertical outcoupling: the valley edge modes lie near K and K', below the light cone, so outcoupling may occur only by air-hole scattering. To improve the optical outcoupling efficiency (as well as to probe the robustness of the regular spacing against defects), a small rectangular defect 818$a$, 818$b$, about 2a long and $\sqrt{3}$a wide, may be introduced, drilled through the top metal plate and the active medium in the irregular cavity loop. Numerical simulations show that the defect 818$a$, 818$b$ has negligible effects on the field distributions (see FIG. 8A) regardless of whether it is placed on an arm or a corner of the triangle. The resulting experimental lasing spectra exhibit substantially stronger peaks, with intensities enhanced by 10-20 times (see also the light-current-voltage characteristics of the topological lasers without an outcoupling defect (FIG. 8D), with a side defect (FIG. 8E), and with a corner defect (FIG. 8F) showing clearly the laser threshold and the 'roll-over' position of the QCL), while the emission peaks still maintain a regular spacing and have negligible frequency shifts relative to the original device (see middle and bottom panels of FIG. 8C). The preservation of the peak frequencies indicates that the defect may not or does not spoil the running-wave character of the lasing modes. With increasing pump current, variations in the relative peak intensities may be observed. This 'mode-hopping' effect may be attributed to mode competition as well as to band structure realignment in the QCL wafer with the increase in the pump current; this is also observed in a known ridge laser fabricated on the same wafer (see FIGS. 12A and 12B and related description below). The light-current-voltage characteristics of FIGS. 8D to 8F correspond to the device emission spectra shown in FIG. 8C. All intensities in FIGS. 8D to 8F are measured with the same intensity scale. It may be inferred from these curves that the emission power is greatly enhanced by the outcoupling defect.

Figure 9A:
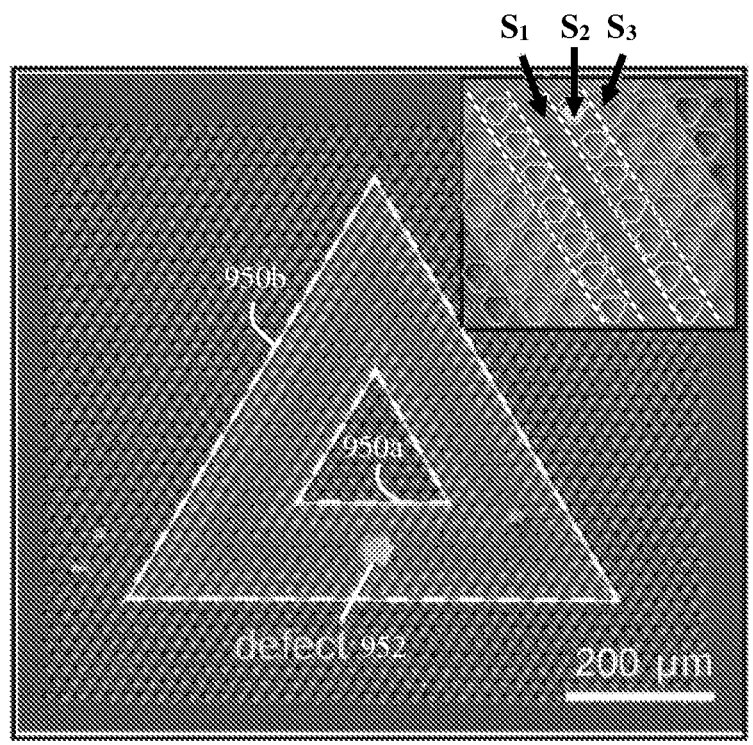
FIGS. 9A to 9D show a terahertz quantum cascade laser (THz QCL) with a triangular loop cavity formed by a photonic crystal waveguide (PCW) and the corresponding results.
Figure 9B:
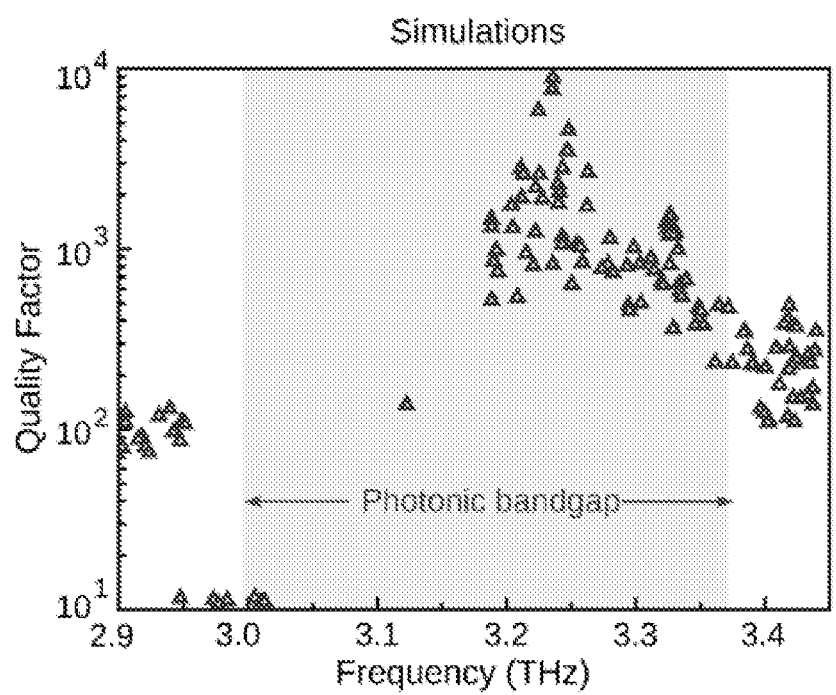
Figure 9C:
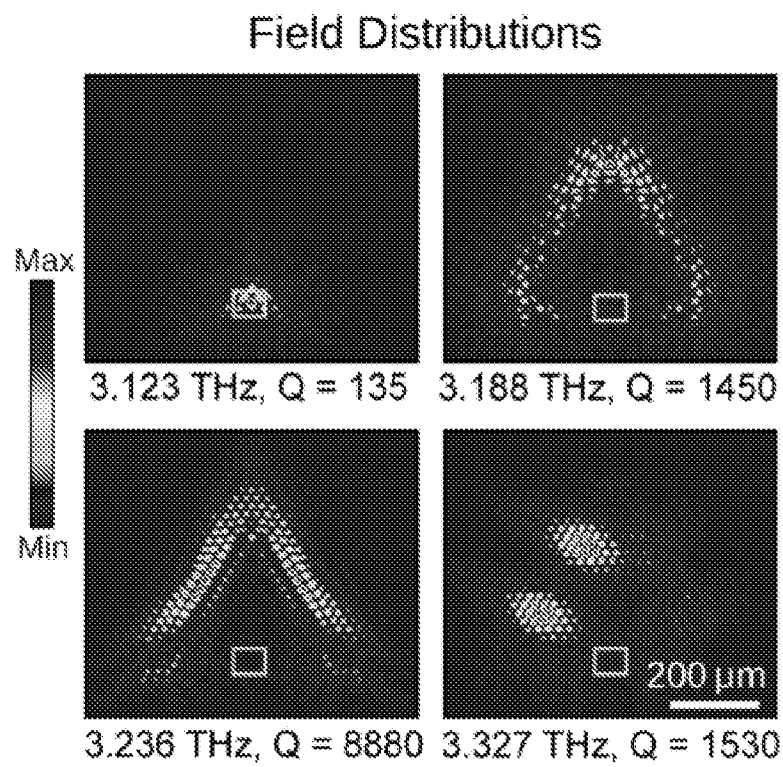
Figure 9D:
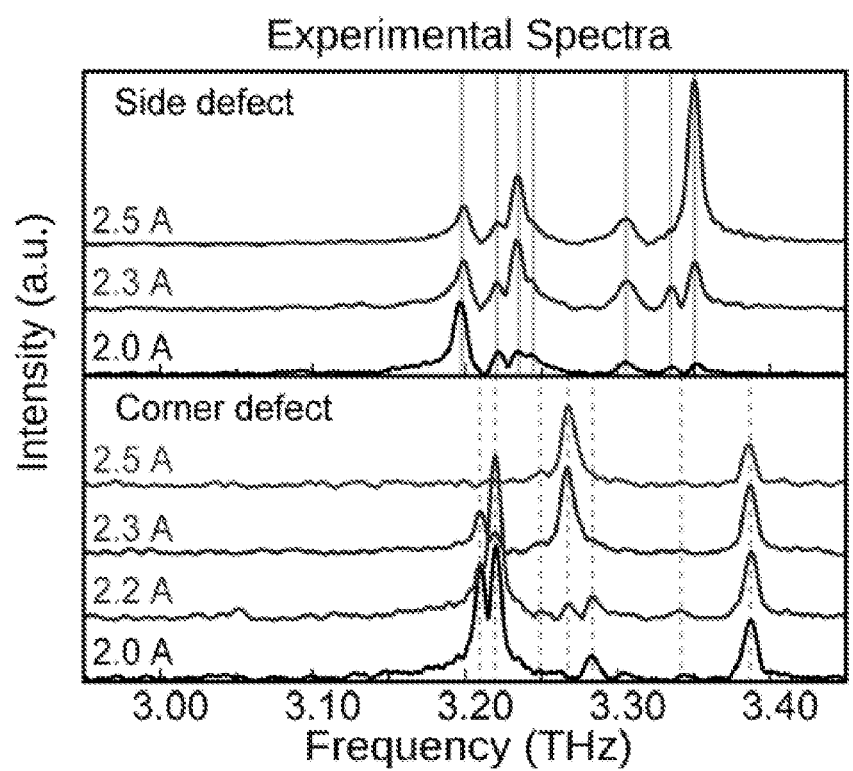

For comparison, a THz QCL not based on a topological waveguide has been fabricated, using a photonic crystal waveguide (PCW) of size-graded holes (e.g., gradually decreasing air hole size from the bulk region to the waveguide center) that forms a triangular loop of similar dimensions, with all holes having the same orientation. For such a PCW, the bulk photonic crystal (PhC) on both sides of the waveguide have the same orientation, i.e., they are the same kind of PhC domain. The PCW can also support optical modes localised at the waveguide region in the perpendicular direction of the waveguide. These modes correspond to defect modes due to the shrunk size. However, they modes are not topologically protected, meaning that the modes cannot propagate through a sharp corner and/or a defect without back-scattering, which tends to result in mode localisation in some part of the irregular cavity. FIG. 9A shows an SEM image of the fabricated structure, with an inset showing a close-up view of the waveguide, which includes size-graded holes (the size scale factor $S_1$=0.77, $S_2$=0.87, $S_3$=1). A side defect 952 is provided to improve outcoupling efficiency. The shaded area bounded by dashed lines 950$a$, 950$b$ represents the pump region. FIG. 9B shows the calculated eigenmode Q factors, with the shaded area indicating the photonic bandgap of the valley Hall lattice, FIG. 9C shows the electric field (|Ez|) plots for calculated eigenmodes of the THz PCW cavity, with the respective white squares indicating the position of the side defect 952, while FIG. 9D shows the emission spectra (vertically offset for clarity) for different pump currents, for the structure having a THz PCW cavity with a side defect (see FIG. 9A) and for another structure (not shown) having a THz PCW cavity with a corner defect, exhibiting irregularly-spaced peaks. As may be observed in FIG. 9D, with a side defect 952 on the arm of the triangular cavity, the experimental spectra exhibit multiple irregularly-spaced lasing peaks between 3.20 and 3.36 THz). When the defect position is moved to a corner of the triangular cavity, a different set of emission peaks may be observed (see bottom panel of FIG. 9D). Numerical simulations reveal numerous eigenmodes distributed over the upper half of the bandgap, with a range of Q factors and without any evident regular spacing patterns as shown in FIG. 9B, qualitatively different from the eigenmode distribution in FIG. 6B for topologically protected modes. The modal intensities are localised to different parts of the triangle, as shown in FIG. 9C, reflecting the tendency of known PCW modes to form standing-wave modes and undergo localisation, unlike the backscattering-resistant valley edge modes. For the triangular photonic crystal cavity as shown in FIG. 9A, the irregularly-spaced peaks that are observed are due to the associated non-topological nature.

To examine the spatial distributions of the topological lasing modes and verify the running-wave nature, a set of lasers that include an array of rectangular outcoupling defects arranged in a larger triangle enclosing the topological cavity may be fabricated. FIG. 10A shows a schematic of the structure, illustrating a triangular loop cavity (represented by the solid triangle 1014 which also defines the domain wall) hosting topological edge states that is surrounded by an array of outcoupling defects 1018a, 1018b, 1018c distributed around the perimeter of a larger triangle with three arms 1030a, 1030b, 1030c. The defects 1018a, 1018b, 1018c may be separated by a distance of several wavelengths (e.g., 42) away from the domain wall 1014 and hence may couple evanescently to the topological cavity lasing modes. For example, the defects 1018a, 1018b, 1018c may be arranged eight lattice periods away from the topological interface 1014, allowing for evanescent outcoupling. The set of defects 1018a, 1018b, 1018c along each arm 1030a, 1030b, 1030c of the triangle may be referred to as an 'emission channel'. By selectively blocking these emission channels (that is, covering the defects 1018a, 1018b, 1018c along certain arms 1030a, 1030b, 1030c), the spatial distributions of the lasing modes may be indirectly probe. FIG. 10A shows different defect-covering configurations for the spectral measurements, where Case 1 refers to the configuration where the arms 1030b, 1030c with respective defects 1018b, 1018c are covered, Case 2 refers to the configuration where the arms 1030a, 1030c with respective defects 1018a, 1018c are covered, and Case 3 refers to the configuration where the arms 1030a, 1030b with respective defects 1018a, 1018b are covered.

When all emission channels are open, regularly spaced emission peaks corresponding to topological lasing modes may be observed, as shown in FIG. 10B illustrating the emission spectra at different pump currents (vertically shifted for clarity) with all defects 1018a, 1018b, 1018c uncovered. Two emission channels may then be sequentially covered, corresponding to Cases 1 to 3, and the emission spectra from the remaining channel measured. FIGS. 10C to 10E show emission spectra at various pump currents for the three different defect-covering configurations corresponding to Cases 1 to 3. As may be observed, in all three cases, the lasing spectra and the relative peak intensities under different pump currents may be essentially the same, indicating that the lasing modes may have equal intensities on the three arms of the triangular loop cavity 1014.

Figure 11A:
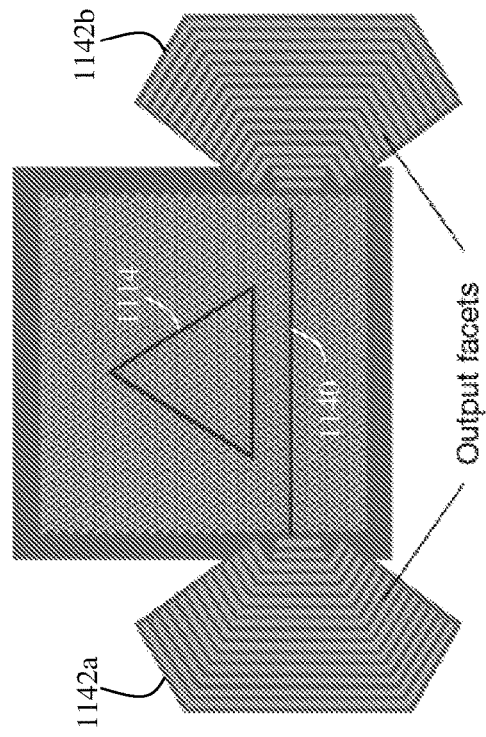
FIGS. 11A to 11D show a topological laser in a directional outcoupling configuration and the corresponding results.
Figure 11B:
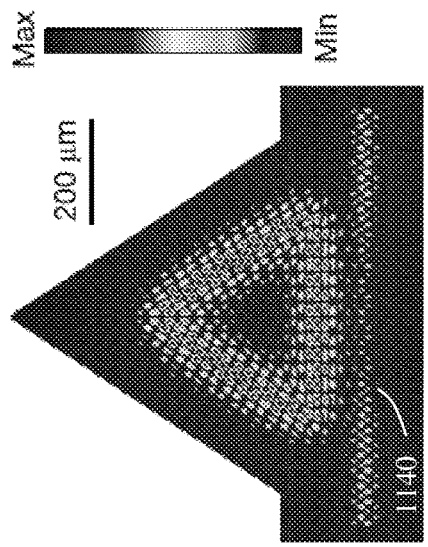

The topological edge states may form degenerate pairs circulating CW (clock-wise) or CCW (counter clock-wise), which may have the same intensity distributions, gain and vertical outcoupling rates. Coupled-mode theory suggests that each topological lasing mode may be composed of an equal-weight superposition of a CW and CCW pair. The coexistence of CW and CCW modes may also explain why the defect along the cavity in FIGS. 6A and 8A may not or does not spoil the running-wave character, even in the presence of backscattering induced by the defect 618, 818a, 818b. To examine this, a sample with an additional straight topological waveguide (or valley edge-state waveguide) 1140 located just below the bottom arm of the triangular laser cavity (with topological interface or domain wall 1114) may be fabricated, as shown in FIG. 11A. Outcoupling gratings 1142a, 1142b may be provided on or towards the left and right ends of the waveguide 1140. Each CW (CCW) cavity mode may evanescently couple to the straight waveguide 1140 and may propagate to the right (left), and may then outcouple via a second-order grating 1142b (1142a). FIG. 11B shows an intensity distribution for a topological eigenmode obtained via a 3D numerical calculation. The results show that the intensity distribution may be maximised at the region of the domain wall 1114.

Figure 11C:
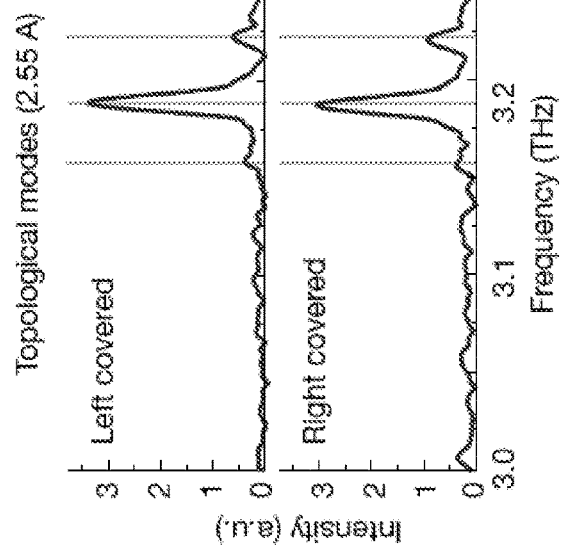
Figure 11D:
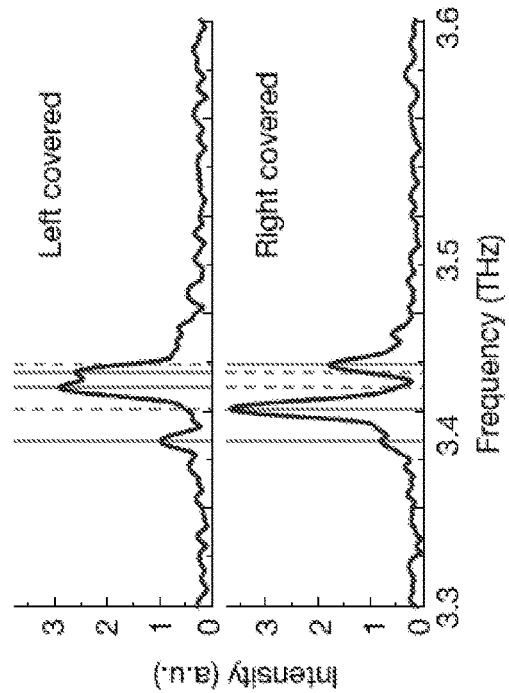

Such a structure is found to support three topological lasing modes with frequencies near 3.2 THz. The output facets (with gratings 1142a, 1142b) may be selectively covered to observe the directionality of the lasing modes. FIGS. 11C and 11D show the emission spectra for the topological lasing modes, and the non-topological lasing modes, respectively, with left and right output facets covered. It should be noted that the two sets of lasing peaks are measured under different pump currents. By selectively covering the left or the right side of the device, it may be observed that each lasing mode emits with approximately equal intensities from the two facets, as shown in FIG. 11C, indicating that the CW and CCW cavity modes have equal weights. For comparison, the same device is observed to also support non-topological lasing modes in a neighbouring frequency range, just above the photonic bandgap (around 3.4 THz), at high pumping currents, for example at 2.96 A. The non-topological lasing modes are observed to emit with very different intensities from the two output facets, as shown in FIG. 11D. In other words, for the topological lasing modes, the spectra have similar peak intensities, whereas for the non-topological lasing modes, the spectra are completely different. This demonstrates a qualitative difference in behaviour between topological and non-topological lasing modes in a single device.

For bidirectional outcoupling of laser modes, as described above with reference to FIG. 11A, the structure features a straight topological waveguide 1140 placed below the triangular cavity 1114 (FIG. 4a). The waveguide 1140 is optically coupled to the cavity 1114. The valley Chern number difference along the straight waveguide 1140 is opposite to that along the bottom arm of the triangular cavity 1114. Owing to valley conservation, a CW (CCW) cavity mode evanescently couples to a right- (left-) moving valley edge mode on the straight waveguide 1140. The output facets on the left and right ends of the straight waveguide are second-order gratings 1142a, 1142b. After using numerical simulations to optimise the grating parameters, the reflection ratio is estimated to be <10%, ensuring negligible light feedback into the straight waveguide 1140 and laser cavity 1114.

Numerical simulations of the structure reveal topological eigenmodes at frequencies near 3.2 THz, within the topological gap of the VPC. The intensity plot for a typical eigenmode is as shown in FIG. 11B. These numerically calculated topological eigenmodes are all twofold degenerate, consistent with the degenerate CW and CCW cavity modes of the triangular loop. Moreover, the structure hosts non-topological lasing modes around 3.4 THz, around the edge of the upper band. The non-topological modes are all non-degenerate.

Figure 11E:
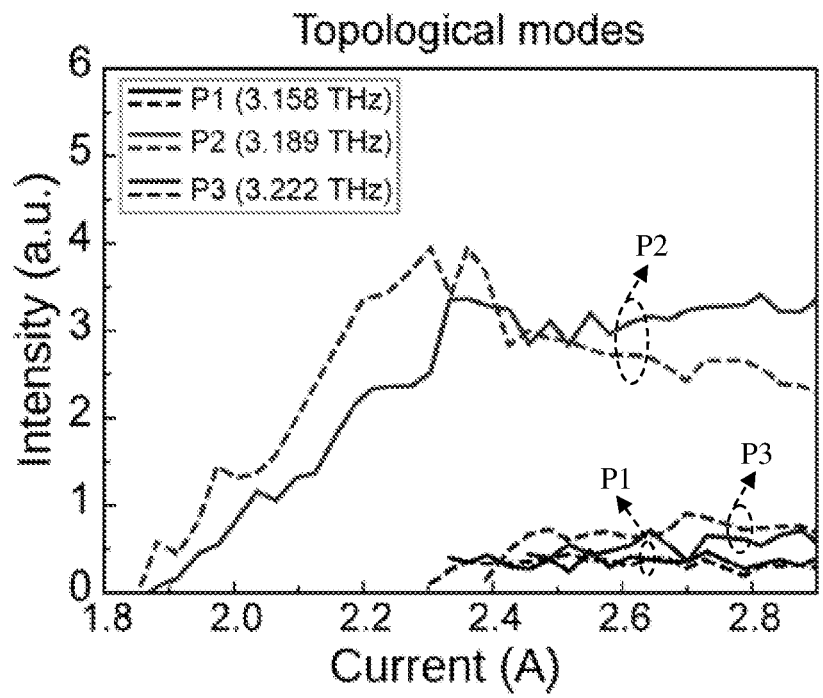
FIGS. 11E and 11F show lasing peak intensity curves for topological and non-topological lasing modes, respectively, in the same laser device in a directional outcoupling configuration.
Figure 11F:
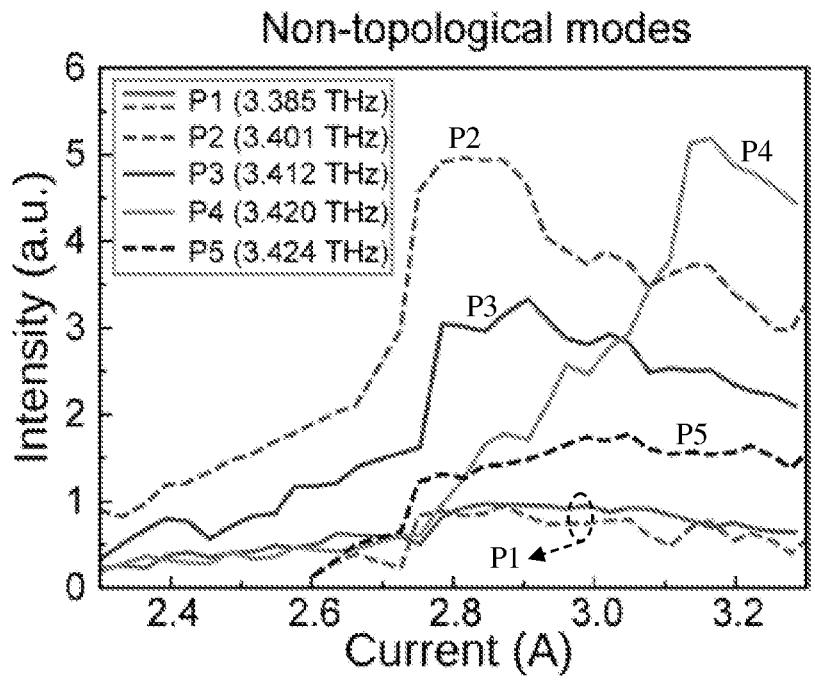

In the study, each topological mode exhibits a 'peak ratio' (the ratio of emission peak intensities from two output facets) close to unity. A typical spectrum is shown in FIG. 11C, and the light-current curves are shown in FIG. 11E where the peak intensities are plotted versus pump current for the topological modes. For the non-topological modes, the peak ratios are far from unity, as shown in FIG. 11D, and FIG. 11F where the peak intensities are plotted versus pump current for the non-topological modes; for some of these, the peak is only clearly observable when one facet is covered but lies within the noise floor when the other facet is covered. In FIGS. 11E and 11F, the solid (dashed) curves correspond to the measurement with left (right) side of the device covered. For the topological lasing modes, the spectra from two output facets have comparable peak intensities, whereas for the non-topological lasing modes, the peaks differ in intensity and frequency in the two cases.

During repeated experimental runs with the same sample, a repeatable set of peak frequencies for both the topological and nontopological lasing modes may be observed, but the exact peak intensities vary between runs due to the imprecise relative alignment of the covering metal sheet and sample. The topological modes may be observed to have peak ratios close to unity, whereas the non-topological modes have different peak ratios.

The device fabrication process for the devices of various embodiments will now be described by way of the following non-limiting examples. The THz QCL wafers used in various embodiments may have a three-well resonant-phonon GaAs/$Al_{0.15}Ga_{0.85}As$ design, with gain curve spanning 2.95 to 3.45 THz. The photonic crystal structures may be patterned onto the wafer with a standard metal-semiconductor-metal (MSM) configuration, as shown in FIG. 5A. In various embodiments, the topological waveguide may include quasi-hexagonal holes (see 608a, 608b; FIG. 6A) with opposite orientations on either side, with wall lengths $d_1$=0.58a and $d_2$=0.26a (or vice versa), where a=19.5 μm is the lattice period. For the non-topological photonic crystal waveguide (PCW), the waveguide may include five rows of size-graded holes embedded in a photonic crystal with a single hole orientation, as shown in FIG. 9A. The outcoupling defect (for example, see 618; FIG. 6A) may include a rectangular hole of a fixed size of approximately 39 μm×33.5 μm. The outcoupling defects for the sample shown in FIG. 10A may include 12 rectangular holes of the same size, uniformly distributed along three triangle arms and situated eight lattice periods away from the topological interface.

The fabrication may begin with metal (Ti/Au 20/700 nm) deposition by an electron-beam evaporator on the THz QCL wafer with an n+-doped GaAs host substrate, followed by Au/Au thermo-compression wafer bonding. Wafer polishing and selective wet etching using $NH_3 \cdot H_2O/H_2O_2/H_2O$=3/57/120 ml may be sequentially conducted to remove the THz QCL substrate down to an etch-stop layer. The etch-stop layer may be removed by hydrogen fluoride (49% cc.) solution (49% hydrofluoric acid solution), and the QCL active region may be exposed for subsequent microfabrication. A 300 nm $SiO_2$ insulation layer may be deposited onto the THz QCL wafer using plasma enhanced chemical vapor deposition (PECVD), followed by optical lithography and reactive-ion etching (RIE) to define the pumping area. The photonic structure patterns may then be transferred onto the THz QCL wafer by optical lithography, with top metal (Ti/Au 20/900 nm) layer deposition and lift-off. With the top metal layer as a hard mask, the photonic structures may be formed by RIE dry etching through the active region with a gas mixture of $BCl_3/CH_4$=100/20 sccm (standard cubic centimetres per minute). The top metal layer (remnant thickness approximately 300 nm) may be retained as a top contact for current injection. The host substrate may be covered by a Ti/Au (15/200 nm) layer as a bottom contact. Finally, the device chip may be cleaved, indium-soldered onto a copper submount, wire-bonded and attached to a cryostat heatsink for measurement.

In terms of device characterisation, fabricated THz laser devices may be characterised using an FTIR (Fourier-transform infrared) spectrometer (Bruker Vertex 70 series) with a room-temperature deuterated-triglycine sulfate (DTGS) detector. Mounted in a helium-gas-stream cryostat with temperature control at 9 K, the devices may be driven by a pulser with repetition rate of 10 kHz and pulse width of 500 ns. The FTIR scanner velocity may be 1.6 kHz with spectrum resolution 0.2 $cm^{-1}$. For the characterisation of the laser device without scattering defect, a scanning speed of 1 kHz may be used to enhance the detector responsivity, resulting in a larger noise level. The emission signal may be captured by the detector in the vertical direction and then Fourier transformed into a spectrum.

To measure the emission from different outcouplers, for example, the rectangular outcoupling defects (for example, 1018a, 1018b, 1018c (FIG. 10A)) or gratings (for example, 1142a, 1142b (FIG. 11A)), a thin metal sheet (approximately 100 μm) coated with an absorptive PMMA (poly(methyl methacrylate)) layer (approximately 100 μm) may be used to cover the device emission surface partially. The absorption layer (single-pass absorption rate approximately 40%) may be coated to reduce the light reflection from the metal sheet. The cover may be positioned using a custom stage with a positional accuracy of about 20 μm. The cover may be placed very close to the device surface: the gap between the device surface and the metal sheet may be smaller than 300 μm.

In terms of numerical simulations, band diagrams and eigenmodes may be calculated with the 3D finite element method simulation software COMSOL Multiphysics. In 3D band diagram calculations, the 10 μm thick QCL medium may be modeled as a lossless dielectric with a refractive index of 3.6 (see discussion above relating to a "dielectric" material), sandwiched between metal layers modelled as perfect electrical conductors. All band structures may be computed for TM polarization. As non-limiting examples, the projected band diagram in FIGS. 4B and 5C may be obtained with a supercell with 10 quasi-hexagonal holes on each side of the domain wall; spurious modes localised at the boundaries of the computational cell may be removed before plotting. In 3D eigenmode calculations, the unpumped portion of the QCL medium may be modelled as a lossy dielectric (see discussion above relating to a "dielectric" material), accounting for the intrinsic loss of the actual semiconductor medium (the imaginary part of the refractive index is 0.0159, corresponding to an absorption loss ~20 $cm^{-1}$). To reduce computational workload, eigenmodes may be computed for a slightly smaller structure with several outermost unit cells removed, but with the triangular loop cavity left unchanged.

Figure 12A:
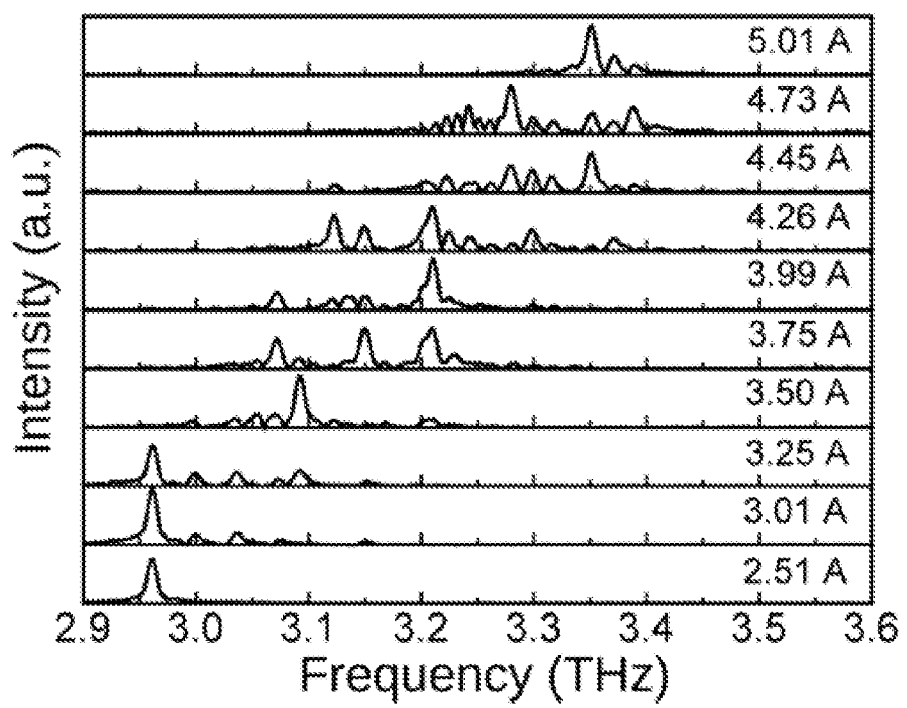
FIGS. 12A and 12B show the emission characteristics of a known ridge laser fabricated on a quantum cascade wafer.
Figure 12B:
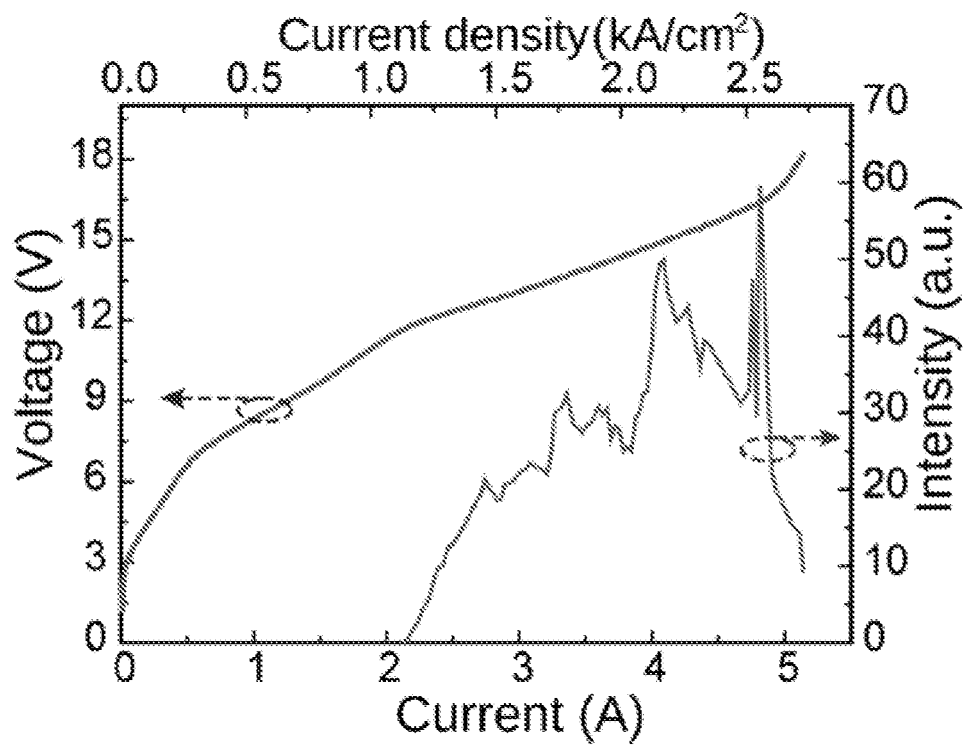

To characterise the gain spectral range and other properties of the THz QCL wafer, a known ridge laser with a stripe dimension of 2000 μm×100 μm is fabricated and examined. FIGS. 12A and 12B show the emission characteristics of a known ridge laser fabricated on a quantum cascade wafer. FIG. 12A shows the emission spectra at different pump currents while FIG. 12B shows the light-current-voltage curves of the ridge laser. On scanning through the entire dynamic range of the pump, the gain spectral range is observed to be approximately 2.95 THz to 3.45 THz. With increasing pump, the emission spectrum envelope gradually blueshifts, which is due to the Stark shift of the intersubband transition in the THz quantum cascade medium. To align the frequency of the VPC bandgap to the gain peak of the THz QCL (approximately 2.9-3.45 THz, evidenced by the range of emission peaks of the ridge laser), a series of VPCs of various periods without any domain wall loop cavity may be fabricated. By studying the lasing peaks, the photonic bandgap of a VPC laser with a=19.50 μm and a size of approximately 820 μm×725 μm is determined to extend from 2.99 THz to 3.39 THz, which is a good match for the gain peak range of the THz QCL wafer. These results allow estimation of the effective refractive index of the QCL active region to be around 3.60 at the operation frequency.

One feature of the topological laser cavity is that it supports whispering-gallery-like running-wave modes even in the presence of the three sharp corners (e.g., of a triangular cavity). By contrast, a trivial cavity cannot support such modes due to strong back-reflection at the corners, which localises the electromagnetic field at various portions of the cavity. This phenomenon can be quantified by calculating the inverse participation ratio (IPR) along the one-dimensional (1D) curve corresponding to the triangular loop. The IPR is may be used to characterise the localisation of modes and is defined as:

$$IPR(\omega) = \frac{\int_L |E_z(\omega, \xi)|^4 d\xi}{\left[\int_L |E_z(\omega, \xi)|^2 d\xi\right]^2} L, \qquad \text{Equation (4)}$$

where $\xi$ is the coordinate parametrising the 1D curve of length L, $\omega$ is the eigenmode frequency, and $E_z$ is the z-component electric field.

The denominator in Equation (4) ensures normalisation. For a mode confined to a length $L_0$, IPR goes as $L/L_0$, whereas for completely delocalised modes with $L_0 \approx L$ leads to IPR$\approx$1; with increasing localisation, $L_0$ decreases and therefore the IPR increases. The numerical IPR results for the triangular loop cavity are shown in FIGS. 13A to 13F. FIGS. 13A and 13B show schematics illustrating the topologically non-trivial and trivial cavities respectively. The 1D interfaces along which the IPR is calculated are indicated by respective triangles indicated in FIGS. 13A and 13B. For the design of the trivial cavity, see FIG. 9A and related description. FIG. 13C shows the IPR versus frequency for eigenmodes in the band gap for each type of cavity. As may be expected, the topological modes have substantially smaller IPR than the non-topological modes. The topological cavity's eigenmodes have consistently lower IPR, indicating that they are more uniformly extended along the loop. FIGS. 13D to 13F show the intensity distributions for three representative eigenmodes of the trivial cavity. For comparison, eigenmodes of the topological cavity are shown in FIG. 8A (top image).

FIG. 6B shows the numerically calculated modes of a triangular cavity formed between two topologically inequivalent VPC domains. These high-Q modes are constructed out of topological edge states that have the characteristics of running waves. From the condition that running waves should interfere constructively over each round trip, the mode separation or the FSR may be estimated. Constructive interference requires $$\Delta k = \frac{2\pi}{L}, \qquad \text{Equation (5)}$$

where k denotes the wavenumber for the running-wave-like envelope function corresponding to any given edge state, and L is the total path length (the circumference of the triangular loop).

The edge states have an approximately linear dispersion relation $\Delta\omega = v\Delta k$, where $\omega$ is the angular frequency detuning relative to mid-gap and $v$ is the group velocity. Hence, the FSR is $$\Delta f = \frac{v}{L}. \qquad \text{Equation (6)}$$

For the structure L$\approx$1,257 µm, it is estimated $v=4.53\times10^7$ m s$^{-1}$ from numerical calculations (see FIG. 5C). This yields $\Delta f \approx 0.036$ THz, which matches well with the simulations and the experimental results (for example, $\Delta f \approx 0.035$ THz for the simulation results shown in FIG. 6B, and $\Delta f \approx 0.033$ THz in the experimental results shown in FIG. 8C).

Figure 14A:
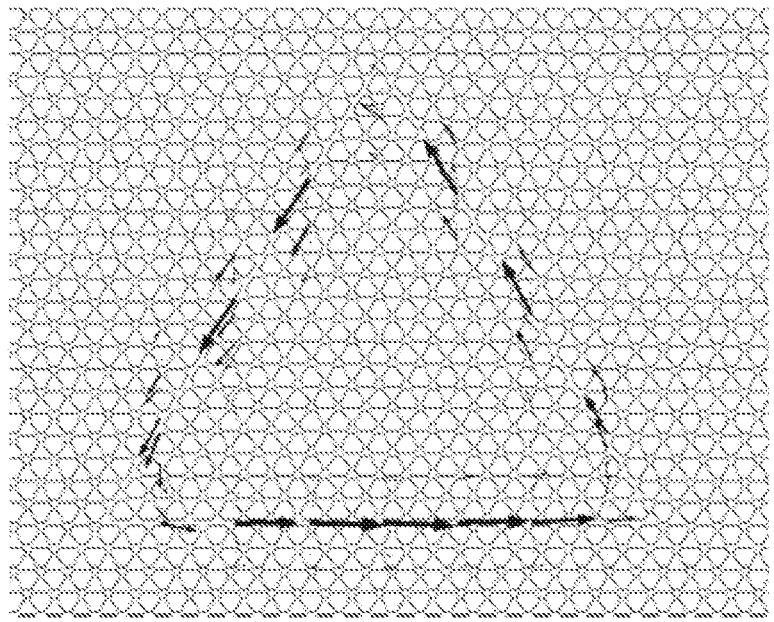
FIGS. 14A and 14B showing the Quiver plots of Poynting vectors for two degenerate modes in a topologically non-trivial triangular loop cavity.
Figure 14B:
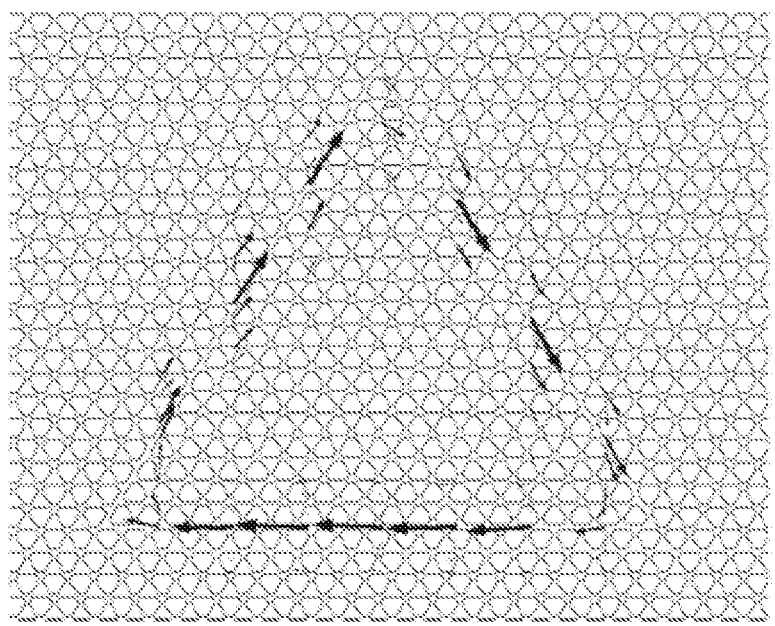

Owing to time-reversal symmetry, each running-wave mode has a degenerate counterpart with opposite circulation direction. Hence, modes may be constructed from superpositions of CW and CCW running waves. Numerical solvers typically may not return the CW and CCW solutions, but rather the superpositions of the two running waves. However, CW and CCW modes may be reconstructed from suitable superpositions of the degenerate solutions returned by the numerical solver. See, for example, FIGS. 14A and 14B showing the Quiver plots of Poynting vectors for two degenerate modes in a topologically non-trivial triangular loop cavity. Starting from two degenerate eigenmodes returned by the numerical solver, denoted by $\psi 1$ and $\psi 2$, the plotted modes are $\psi 1 + i\psi 2$ (FIG. 14A) and $\psi 1 - i\psi 2$ (FIG. 14B). These have CCW and CW characteristics, respectively.

The CW and CCW valley edge modes form two orthogonal basis modes and thus each topological lasing mode is a superposition of CW and CCW valley edge modes. To determine the superpositions, the framework of coupled-mode theory may be used. There are two effects acting on the CW and CCW modes: weak coupling between CW and CCW modes, induced for example by symmetry-breaking defects in the VPC; and gain and loss, which may be due to amplification by the gain medium, material dissipation and radiative outcoupling.

Using coupled-mode theory, the states of the laser may be represented by $\psi=(ab)^T$, where a and b are the CW and CCW mode amplitudes respectively, and the superscript "T" means the transpose transform of the matrix ab. The condition for steady-state lasing is $$H_0 \psi + i\left(\frac{g}{1+|\psi|^2} - \gamma\right)\psi = \delta\omega\psi, \qquad \text{Equation (7)}$$

where $$H_0 = \begin{bmatrix} 0 & -\kappa \\ -\kappa & 0 \end{bmatrix}$$

is a Hermitian Hamiltonian containing a coupling rate $\kappa$ between the CW and CCW modes, both of which have zero frequency detuning, $\delta\omega$ is the frequency detuning of the steady-state lasing mode, g is the amplification rate due to the gain medium, and $\gamma$ is the loss rate due to material dissipation and radiative outcoupling. It should be noted that the gain is saturable.

The non-Hermitian terms are diagonal because the CW and CCW modes are topologically protected running waves that have the same intensity distribution, and therefore may experience the same rates of gain and loss.

Regardless of the non-Hermitian terms, the solutions to the coupled-mode equation are $$\psi \propto \frac{1}{\sqrt{2}}(1\ \ 1)^T \text{ for } \delta\omega = +\kappa, \qquad \text{Equation (8a)}$$

$$\psi \propto \frac{1}{\sqrt{2}}(1\ -1)^T \text{ for } \delta\omega = -\kappa. \qquad \text{Equation (8b)}$$

In other words, the CW and CCW modes may contribute equally to the steady-state lasing mode. The overall amplitude may be determined by setting the imaginary part of the eigenproblem to zero.

These results hold not only at the lasing threshold, but also in the above-threshold regime where gain saturation is in effect. Above threshold, provided κ is not too large, a single steady-state lasing mode may be spontaneously chosen from one of the two possible solutions solved above, and the other solution may be suppressed (that is, its amplitude is pinned to zero) by gain competition.

The above analysis rests on the idea that the underlying a and b modes are counter-propagating topological modes. It may not apply if the modes experience different gain/loss rates (so that the non-Hermitian term is non-diagonal), or if they are non-degenerate—as may be the case in the non-topological cavity, which lacks running-wave-like edge states.

While the techniques are described herein in relation to quasi-hexagonal holes, it should be appreciated that the holes may be of other suitable shapes, e.g., a triangle, as long as the inversion symmetry is broken.

As described above, various embodiments may provide lasers (e.g., electrically pumped lasers) based on the topologically-protected edge modes (or topological edge states) of a valley photonic crystal, operating in the THz frequency regime. For example, various embodiments may provide a topological laser operating at THz frequency regime based on a quantum cascade laser. The laser of various embodiments may include a waveguiding portion having a first conductive (or metal) layer, an active region on the first conductive layer, and a second conductive (or metal) layer on the active region. A plurality of VPC air holes may be formed in the second conductive layer and the active region of the waveguiding portion, wherein each hole may have a shape with 120° rotation symmetry. The interfaces between regions with different hole orientations (opposite valley Chern number signs) may act as electromagnetic waveguides to form a closed laser cavity. One feature provided is the robust running-wave nature of the lasing modes, which may persist despite the sharp corners of the cavity. The introduction of a scattering defect is shown to improve performance by enhancing the outcoupling efficiency while without affecting running wave lasing features. For comparison, as described above, a laser utilising a known waveguide has qualitatively different behavior. By examining several different device configurations, the running-wave features of the topological lasing modes have been demonstrated. An observation that may be derived is the regular mode spacing, which arises because the modes have running-wave characteristics despite the sharp corners of the cavity and various other disturbances. The design principle of the techniques disclosed herein may also be conveniently implemented in all other lasers. Apart from possible applications for robust lasing or as a robust THz light source, this THz QCL platform may be useful for fundamental investigations into the dynamical and nonlinear features of topological laser modes. Further, the realisation of an electrically pumped topological laser points the way towards incorporating topological protection into practical device applications.

As described above, the techniques disclosed herein may provide one of more of (1) robustness against defect and sharp corners provided by a non-trivial topology, (2) cavity design flexibility because lasing can occur in an irregular cavity, and (3) a compact design and electrically pumping scheme of a topological laser.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A laser source comprising:
 a substrate; and
 an active medium over the substrate, the active medium comprising:
  a first metallic conductive layer arranged proximate to the substrate;
  a second metallic conductive layer over the first metallic conductive layer;
  an active region sandwiched between the first metallic conductive layer and the second metallic conductive layer; and
 a photonic crystal structure formed in the active region and the second metallic conductive layer, the photonic crystal structure comprising:
  a first domain comprising a plurality of first holes defined therein, the first domain being associated with a first set of Chern numbers; and
  a second domain comprising a plurality of second holes defined therein, the second domain being associated with a second set of Chern numbers,
  wherein the plurality of first holes and the plurality of second holes are arranged to define an interface region between the first domain and the second domain, the interface region defining an optical cavity for lasing,
  wherein the plurality of first holes and the plurality of second holes are defined through an entire depth of the active region, and
  wherein the active region is arranged directly on the first metallic conductive layer.

2. The laser source as claimed in claim 1,
 wherein each of the first domain and the second domain is associated with a first valley and a second valley,
 wherein the first set of Chern numbers comprises a first Chern number associated with the first valley of the first domain and a second Chern number associated with the second valley of the first domain,
 wherein the second set of Chern numbers comprises a third Chern number associated with the first valley of the second domain and a fourth Chern number associated with the second valley of the second domain,
 wherein the first Chern number and the third Chern number are opposite numbers, and,
 wherein the second Chern number and the fourth Chern number are opposite numbers.

3. The laser source as claimed in claim 2,
wherein the first Chern number and the third Chern number differ from each other by an integer, and
wherein the second Chern number and the fourth Chern number differ from each other by an integer.

4. The laser source as claimed in claim 1,
wherein each of the plurality of first holes comprises a shape with a 120° rotation symmetry arranged in a first orientation, and
wherein each of the plurality of second holes comprises the shape with the 120° rotation symmetry arranged in a second orientation.

5. The laser source as claimed in claim 4, wherein the shape comprises a quasi-hexagonal shape or an equilateral triangular shape.

6. The laser source as claimed in claim 1, wherein the optical cavity comprises a loop cavity.

7. The laser source as claimed in claim 1, wherein the optical cavity comprises at least one corner or bend.

8. The laser source as claimed in claim 1, wherein the optical cavity has a triangular shape or a trapezoidal shape.

9. The laser source as claimed in claim 1, further comprising at least one out-coupling agent along the optical cavity.

10. The laser source as claimed in claim 1, further comprising an optical waveguide optically coupled to the optical cavity.

11. The laser source as claimed in claim 10, further comprising at least one output coupler optically coupled to the optical waveguide.

12. The laser source as claimed in claim 1, wherein the laser source comprises a quantum cascade laser.

13. A method for forming a laser source comprising:
forming an active medium over a substrate, the active medium comprising:
a first metallic conductive layer arranged proximate to the substrate;
a second metallic conductive layer over the first metallic conductive layer; and
an active region sandwiched between the first metallic conductive layer and the second metallic conductive layer; and
forming a photonic crystal structure in the active region and the second metallic conductive layer, the photonic crystal structure comprising:
a first domain comprising a plurality of first holes defined therein, the first domain being associated with a first set of Chern numbers; and
a second domain comprising a plurality of second holes defined therein, the second domain being associated with a second set of Chern numbers,
wherein the plurality of first holes and the plurality of second holes are arranged to define an interface region between the first domain and the second domain, the interface region defining an optical cavity for lasing,
wherein the plurality of first holes and the plurality of second holes are defined through an entire depth of the active region, and
wherein the active region is arranged directly on the first metallic conductive layer.

14. The method as claimed in claim 13,
wherein each of the first domain and the second domain is associated with a first valley and a second valley,
wherein the first set of Chern numbers comprises a first Chern number associated with the first valley of the first domain and a second Chern number associated with the second valley of the first domain,
wherein the second set of Chern numbers comprises a third Chern number associated with the first valley of the second domain and a fourth Chern number associated with the second valley of the second domain,
wherein the first Chern number and the third Chern number are opposite numbers, and
wherein the second Chern number and the fourth Chern number are opposite numbers.

15. The method as claimed in claim 14,
wherein the first Chern number and the third Chern number differ from each other by an integer, and
wherein the second Chern number and the fourth Chern number differ from each other by an integer.

16. The method as claimed in claim 13,
wherein each of the plurality of first holes comprises a shape with a 120° rotation symmetry arranged in a first orientation, and
wherein each of the plurality of second holes comprises the shape with the 120° rotation symmetry arranged in a second orientation.

17. The method as claimed in claim 13, wherein the optical cavity comprises at least one corner or bend.

18. The method as claimed in claim 13, further comprising forming at least one out-coupling agent along the optical cavity.

* * * * *